US011913711B2

(12) United States Patent
Muth et al.

(10) Patent No.: US 11,913,711 B2
(45) Date of Patent: Feb. 27, 2024

(54) ENCLOSURE ASSEMBLY WITH SLIDING LOCK

(71) Applicant: Leer, Inc., New Lisbon, WI (US)

(72) Inventors: Daniel J. Muth, La Valle, WI (US); Patrik Gorun, Wisconsin Dells, WI (US)

(73) Assignee: Leer, Inc., New Lisbon, WI (US)

( * ) Notice: Subject to any disclaimer, the term of this patent is extended or adjusted under 35 U.S.C. 154(b) by 994 days.

(21) Appl. No.: 16/685,493

(22) Filed: Nov. 15, 2019

(65) Prior Publication Data

US 2020/0103160 A1 Apr. 2, 2020

Related U.S. Application Data

(60) Division of application No. 15/818,841, filed on Nov. 21, 2017, now Pat. No. 10,480,848, which is a continuation of application No. 15/258,583, filed on Sep. 7, 2016, now Pat. No. 9,861,212.

(51) Int. Cl.

*B21D 39/03* (2006.01)
*F25D 23/06* (2006.01)
*E05B 65/00* (2006.01)

(52) U.S. Cl.

CPC .......... *F25D 23/063* (2013.01); *B21D 39/03* (2013.01); *E05B 65/0042* (2013.01)

(58) Field of Classification Search

CPC ... F25D 23/063; B21D 39/03; E05B 65/0042; F16B 12/02; F16B 12/10; F16B 12/12; F16B 12/125; F16B 12/20; F16B 12/26; F16B 12/28; F16B 12/32; F16B 12/38; F16B 12/44; F16B 2012/443; F16B 2012/446; F16B 12/50; Y10T 29/4987; Y10T 29/49876

USPC .................................................... 29/450, 453

See application file for complete search history.

(56) References Cited

U.S. PATENT DOCUMENTS

| | | | |
|---|---|---|---|
| 2,259,382 | A | 10/1941 | Ingles |
| 2,522,097 | A | 9/1950 | Cookson |
| 2,773,729 | A | 12/1956 | Derman |
| 3,131,794 | A | 5/1964 | Bender |
| 3,297,384 | A | 1/1967 | Buice |
| 3,710,525 | A | 1/1973 | Lopes |
| 3,733,651 | A | 5/1973 | McKay |
| 3,733,767 | A | 5/1973 | Craik |
| 3,969,866 | A | 7/1976 | Kyne |
| 4,295,693 | A | 10/1981 | Viklund |
| 4,296,982 | A | 10/1981 | Kullander |

(Continued)

*Primary Examiner* — Sarang Afzali
*Assistant Examiner* — Darrell C Ford
(74) *Attorney, Agent, or Firm* — Foley & Lardner LLP

(57) ABSTRACT

A method of assembling an outer cabinet of an enclosure includes: coupling a first panel of the outer cabinet to a second panel of the outer cabinet utilizing a first joint type; coupling a third panel of the outer cabinet to the first panel using a second joint type by rotating the third panel relative to the first panel; coupling a fourth panel of the outer cabinet to the first panel using the second joint type by rotating the fourth panel relative to the first panel; coupling a fifth panel of the outer cabinet to the first panel using a third joint type; coupling the fifth panel to the third panel and to the fourth panel using a fourth joint type; and coupling a sixth panel to each of the second, third, fourth, and fifth panels to form the outer cabinet.

8 Claims, 28 Drawing Sheets

(56) References Cited

U.S. PATENT DOCUMENTS

| | | | | |
|---|---|---|---|---|
| 4,296,983 | A | 10/1981 | Rogers et al. | |
| 4,621,877 | A | 11/1986 | Boudreau et al. | |
| 5,221,131 | A | 6/1993 | Lesperance et al. | |
| 5,908,229 | A | 6/1999 | Wetherholt et al. | |
| 6,561,601 | B1 | 5/2003 | Maffeo | |
| 8,042,890 | B2 | 10/2011 | Collins et al. | |
| 10,051,961 | B2 * | 8/2018 | Fritsche | A47F 9/00 |
| 2006/0101644 | A1 * | 5/2006 | Yong | B21D 53/88 29/897.2 |
| 2007/0095094 | A1 | 5/2007 | Lucas et al. | |
| 2008/0238177 | A1 | 10/2008 | Hsiao | |
| 2010/0189492 | A1 * | 7/2010 | Green | F16B 12/22 312/352 |
| 2014/0110414 | A1 | 4/2014 | Piendl et al. | |
| 2014/0345316 | A1 * | 11/2014 | Godbole | A47F 3/005 312/265.5 |
| 2015/0230600 | A1 * | 8/2015 | Schulte | F16B 12/26 312/265.5 |
| 2015/0368896 | A1 | 12/2015 | Schulte | |
| 2017/0049226 | A1 * | 2/2017 | Fritsche | A47F 5/10 |
| 2020/0190837 | A1 * | 6/2020 | Xia | E04H 1/1205 |
| 2023/0221062 | A1 * | 7/2023 | Park | A47B 96/20 312/406.2 |

* cited by examiner

ENCLOSURE ASSEMBLY WITH SLIDING LOCK

CROSS-REFERENCE TO RELATED APPLICATIONS

This application is a divisional of U.S. patent application Ser. No. 15/818,841, filed Nov. 21, 2017, entitled "ENCLOSURE ASSEMBLY WITH SLIDING LOCK," which is a continuation of U.S. patent application Ser. No. 15/258,583, filed Sep. 7, 2016, entitled "ENCLOSURE ASSEMBLY WITH SLIDING LOCK," both of which are incorporated herein by reference in their entireties.

TECHNICAL FIELD

The present disclosure relates to systems and methods for assembling and providing an enclosure, such as an enclosure for an ice merchandiser that is used to store and provide an ice product to customers.

BACKGROUND

Enclosures are used in a variety of applications. One type of an enclosure is an insulated enclosure, which includes insulation to maintain or substantially maintain an interior space of the enclosure at a desired temperature. An example of an insulated enclosure is an ice merchandiser enclosure for storing and supplying ice products (e.g., bagged ice) to patrons.

Ice merchandisers are usually fairly large and heavy temperature-controlled storage units. Their size and shape is often dependent upon the ice product that they are designed to store (e.g., one-hundred seven pound bags of ice, three-hundred seven pound bags of ice, etc.), the presence of a refrigeration system, the use of heavy-duty weather-resistant (e.g., rust resistant) materials, and the like. The ice merchandiser usually includes an inner housing and an outer housing. The outer housing is typically made by sheet metal panels connected by welds, soldering, and/or fasteners. However, the outer housing can be difficult for technicians to construct or assemble because the technicians may be required to perform various actions in uncomfortable positions (e.g., soldering over-head). Thus, complicated assembly processes can result in relatively long lead times (i.e., the time to make an enclosure) and even result in errors in the construction of such enclosures (e.g., gaps between adjoined walls).

SUMMARY

One embodiment relates to an ice merchandiser for storing bagged ice for purchase by a customer. According to one embodiment, the ice merchandiser includes a cabinet assembly including a base panel, a front panel, a rear panel, a right side panel, a left side panel, and a top panel. A first joint type is used to couple the rear panel to the base panel, the base panel to each of the right and left side panels, and the rear panel to each of the right and left side panels. A second joint type is used to couple the top panel to the right side panel, wherein the second joint type includes a slide channel structured to receive a flange of the right side panel and a flange of the top panel to couple the top panel to the right side panel. According to one configuration, the first joint type is different from the second joint type, and each of the first joint type and the second joint type do not use a fastener or an adhesive.

Another embodiment relates to joint for assembling an outer cabinet of an enclosure. The joint includes a first panel having a first flange extending away from the first panel in a substantially perpendicular manner; a second panel having a first flange extending away from the second panel in a substantially perpendicular manner; and a slide channel including a first flange interconnected to a second flange positioned parallel to the first flange to define a channel, wherein the channel is structured to receive the first flange of the first panel and the first flange of the second panel to couple the first panel to the second panel without the use of a fastener. According to one embodiment, the enclosure is used to construct an ice merchandiser.

Still another embodiment relates to a method of assembling an outer cabinet of an enclosure. The method includes: coupling a front panel of the outer cabinet to a base panel of the outer cabinet utilizing a first joint type; rotating a right side panel of the outer cabinet relative to the front panel to couple the right side panel to the front panel using a second joint type; rotating a left side panel of the outer cabinet relative to the front panel to couple the left side panel to the front panel using the second joint type; coupling a top panel of the outer cabinet to front panel using a third joint type; coupling the top panel to the right side panel and the left side panel using a fourth joint type; and coupling a rear panel to each of the base panel, top panel, and right and left side panels to form the outer cabinet assembly. According to one embodiment, the coupling of each panel of the outer cabinet assembly is without a fastener; each of the first, second, third, and fourth joint types are different; and, the top panel is coupled to the right side panel using a first slide channel structured to engage with each of the right side panel and the top panel while the top panel is coupled to the left side panel using a second slide channel structured to engage with each of the left panel and the top panel. According to one embodiment, the enclosure is used to construct an ice merchandiser.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

DETAILED DESCRIPTION

Figure 1:
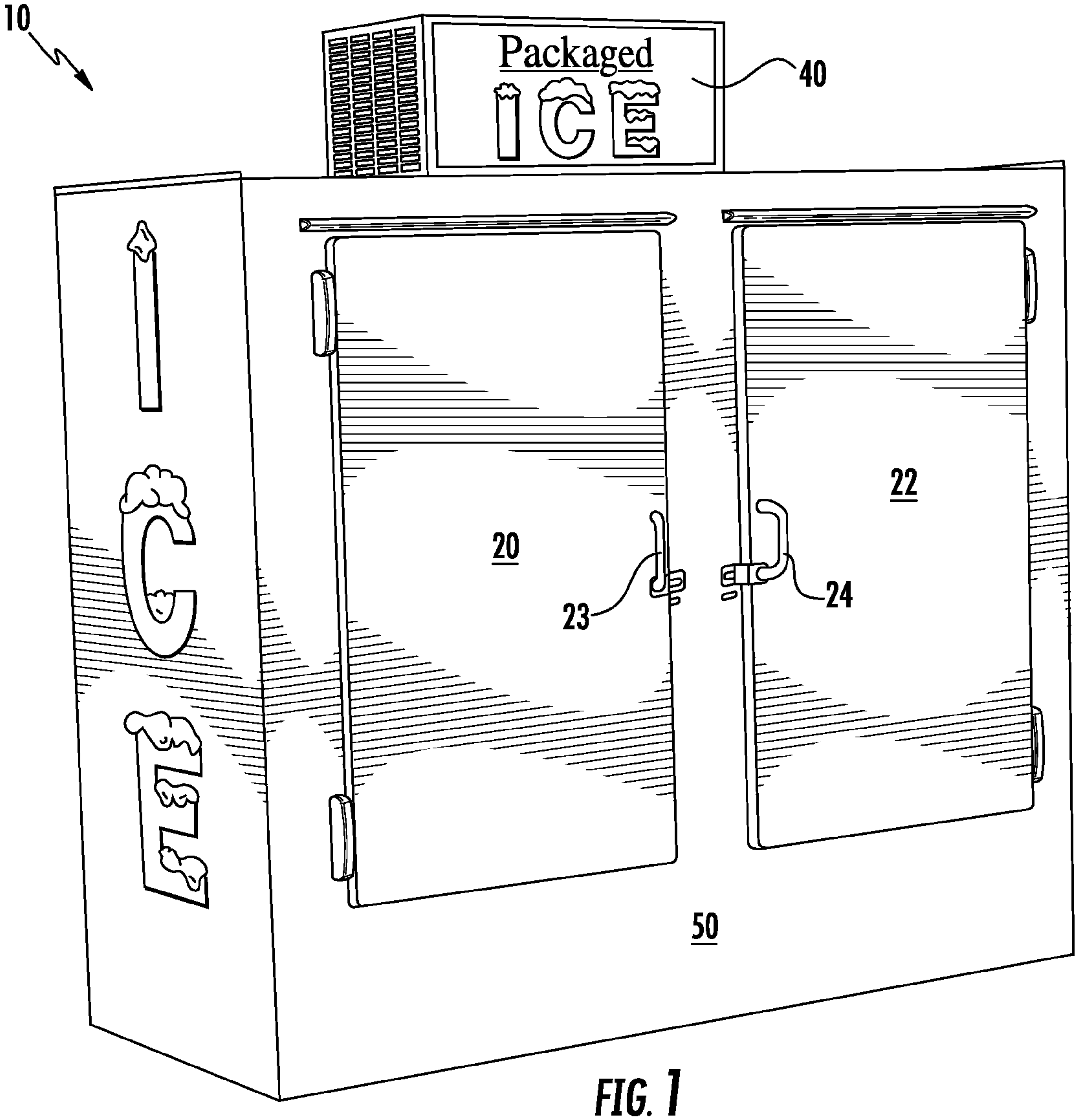
FIG. 1 is a front perspective view of an enclosure, shown as an ice merchandiser, according to an example embodiment.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to the Figures generally, an enclosure assembly with a sliding lock is provided according to several embodiments herein. In one embodiment, the enclosure assembly with sliding lock is utilized with a temperature-controlled case and, in particular, an ice merchandiser. The ice merchandiser may be structured to store and supply an ice product (e.g., bagged ice) to patrons. However, in other embodiments, the enclosure assembly with sliding lock may be utilized in a variety of other applications including insulated and non-insulated applications. For example, the enclosure assembly and sliding lock may be utilized to construct a housing, such as a pet/animal house. As another example, the enclosure may be used in a lab setting, such as an environmental lab testing enclosure (e.g., an environmental control cabinet). As still another example, the enclosure may be to construct filing cabinets. Thus, while the disclosure is primarily directed herein towards an enclosure assembly for an ice merchandiser, such a description is not meant to be limiting as the present disclosure may be applicable in a variety of different applications, with all such applications intended to fall within the scope of the present disclosure. Further and due to the wide array of applications of the enclosure assembly of the present disclosure, a wide array of insulating materials may also be used with all such variations intended to fall within the scope of the present disclosure.

According to the present disclosure, the ice merchandiser includes a housing (also referred to as an enclosure or enclosure assembly) having an inner shell or cabinet, an outer shell or cabinet coupled to inner shell, and a storage space defined by the inner shell. The storage space is structured to store an ice product and enable patrons to selectively grab or obtain the stored ice product. The outer cabinet surrounds or substantially surrounds the inner cabinet. A space may be defined between the inner and outer cabinets. The space may be structured to receive an insulating material to help maintain a desired temperature of the storage space. In other embodiments, the space may be unfilled with insulation to, in turn, form an air gap. In either configuration, the inner shell, outer shell, and space serve as a barrier or insulator for the interior storage space.

The outer cabinet may be constructed from a plurality of panels that provide modularity and scalability to the housing. In particular and in one example embodiment, the outer cabinet includes a base panel, a front panel coupled to the base panel, a rear panel disposed substantially opposite the front panel and coupled to the base panel, left and right side panels coupled to each of the base panel and the front panel, a rear panel coupled to the base panel and each of the left and right side panels, and a top panel coupled to the front panel, rear panel, and each of the left and right side panels. According to the present disclosure, the top panel is coupled to the left side panel and right side panel using a slide lock or slide locking mechanism (one slide lock per connection: one slide lock to couple the top panel to the right side panel and one slide lock to couple the top panel to the left side panel). The slide lock may include a first flange interconnected with a second flange positioned parallel to the first flange to define a channel. The channel may be structured to receive parallel or substantially parallel flanges from each of the coupled panels (e.g., in regard to the top panel to left side panel coupling, the channel receives a flange from the top panel and a flange the left side panel). In use, the slide lock then slides, snaps, or clips into position to hold or retain the flanges of the left and right side panels together to securably couple the top panel to each of the left and right side panels. In certain configurations, upon coupling, an audible noise may be created to indicate that the slide lock is coupled to the received flanges. Advantageously, the audible noise may work to reduce guesswork by knowing that the slide lock is in the full or locked position and that the panels are coupled together. According to the present disclosure and in one embodiment, the remaining panels are coupled together by a series of joints or seams that neither use fasteners nor adhesives.

Beneficially and as alluded to above, the coupling of the panels may be accomplished through a series of joints or seams without (or a substantial decrease in) the use of fasteners (e.g., screws, rivets, bolts, etc.) or various adhesives (e.g., epoxy, glue, etc.) or adhesion processes (e.g., welding, soldering, etc.). As a result, assembly of the outer cabinet may be relatively quick due to the elimination of these fasteners and joining processes. Further, the ergonomics of the assembly may be improved due to technicians not needing to or substantially not needing to hold tools for implementing these joining processes or attaching these fasteners. Moreover, because the joints are integrated with each panel, the outer cabinet may be assembled with a higher degree of precision (i.e., a reduction in gaps between coupled panels, ninety-degree angles between perpendicular coupled panels, etc.). As a result, the integrity of the outer cabinet may improve due to a reduction in these imperfections. Additionally, due to this reduction in gaps and closer-fit joints, when insulation is inserted, the expansion properties of the insulation do not or may negligibly adversely affect the integrity of the joints (i.e., the joints resist de-coupling from the expanding insulation). Along these lines, by making the joints integrated with the panels by, e.g., bending the panels into flanges and hems, additional strength is imparted into the panels by the shaping and bending. In addition to these benefits, various production benefits may also be experienced by the present disclosure. For example, the assembly process does not need to be confined to certain work stations in a production floor (i.e., land-locked) because the use of tools for various joining processes (e.g., welding) may be substantially alleviated. As a result, production managers may experience a relatively high degree of flexibility in coordinating the assembly of the enclosures of the present disclosure. These and other features and benefits of the present disclosure are explained more fully herein.

Figure 2:
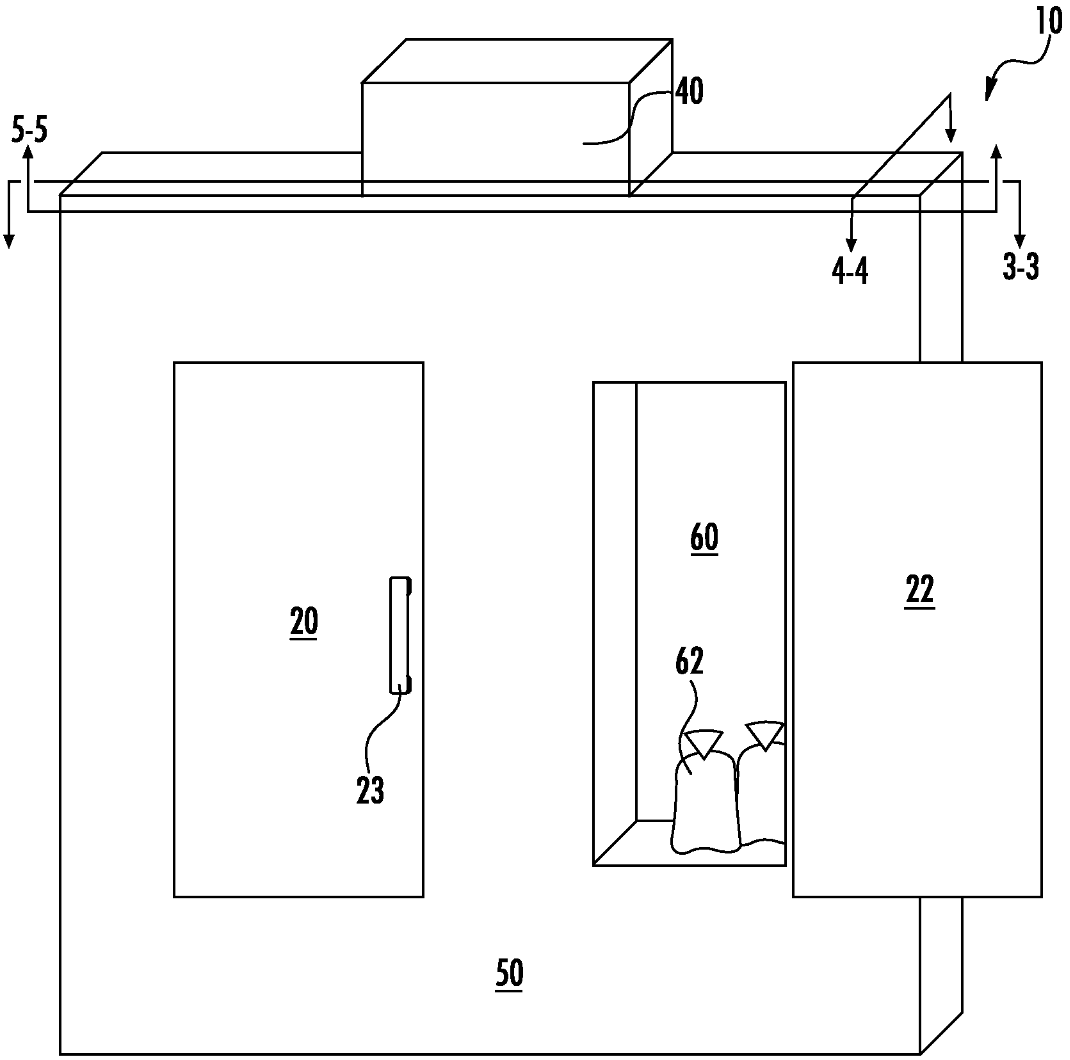
FIG. 2 is a front view of the ice merchandiser of FIG. 1, according to an example embodiment.

Referring now to FIGS. 1-2, an assembled housing or enclosure (shown as an ice merchandiser) is depicted according to one embodiment. The ice merchandiser 10 is structured as a temperature controlled case for storing, holding, and supplying ice products (e.g., bagged ice) to patrons. As shown, the ice merchandiser 10 is structured as a substantially vertically oriented (i.e., upright relative to a support surface) ice merchandiser with front access doors 20, 22. However, the present disclosure is applicable with any ice merchandiser configuration including, but not limited to: a slant oriented ice merchandiser where the door(s)/front panel is at an angle or slant relative to the support surface, a horizontal ice merchandiser with access door(s) oriented substantially parallel to the support surface, etc. The two-door embodiment of the ice merchandiser 10 includes a first door 20 having a first handle 23, a second door 22 having a second handle 24, a cooling system 40, and a housing 50 that defines a storage space 60 for storing and holding the ice product.

As mentioned above and in the example configuration depicted, the ice merchandiser 10 includes a first door 20 and a second door 22. Each of the doors 20, 22 are movable between a first position and a second position. FIG. 1 depicts the first door 20 and the second door 22 in the first position. The first position refers to a closed position of the doors. In the first position, access to the storage space 60 (e.g., cavity, etc.) defined by the housing 50 is substantially prevented via the doors 20, 22. In comparison, FIG. 2 depicts the first door 20 in the first position and the second door 22 in the second position. In the second position (also referred to as an open position), the doors 20, 22 are spaced apart from the housing 50 such that access to the storage space 60 is permitted. It should be understood that in other ice merchandiser configurations, more than two or less than two doors may be utilized. The two-door embodiment shown and described herein is for example purposes only with all such variations intended to fall within the spirit and scope of the present disclosure.

The ice merchandiser 10 is shown to include a cooling system 40. The cooling system 40 is structured to cool the storage space 60 to a desired temperature (e.g., maintain the storage space temperature at or below the melting temperature of ice to substantially prevent the ice product from melting). The cooling system 40 may include any type of components for cooling the storage space 60. In turn, the cooling system 40 may include, but is not limited to, one or more compressors, evaporator coils, condenser coils, conduits, valves, fan(s), a refrigerant source, plenums, etc. Although FIGS. 1-2 depict the cooling system 40 located in the top of the housing 50, the cooling system 40 may be located in any suitable position that enables the cooling system 40 to cool/refrigerate the cavity 60.

As mentioned above, the housing 50 defines a cavity 60, also referred to herein as the storage space 60 (see, e.g., FIG. 2). The storage space 60 is structured as an interior volume for receiving, storing, and supplying an ice product, such as bagged ice product 62. Depending on the type of and application for the ice merchandiser 10, the size and shape of the storage space 60 may vary. For example, the storage space 60 may have forty cubic feet capacity, forty-six cubic feet capacity, seventy-five cubic feet, etc. Moreover, the storage space 60 may be compartmentalized with one or more walls separating two or more storage spaces (i.e., sub-cavities or sub-storage spaces). In some instances, each sub-storage space may be designed to hold a different ice product and the sub-storage space shapes may vary (e.g., square prism, rectangular prism, etc.). Furthermore, based on the size of the storage space 60, the number of ice products and particularly, bagged ice products 62, may vary. Additionally, it should be understood that the size and shape of the bagged ice product 62 is highly configurable (e.g., 3 pound bagged ice product, 5 pound bagged ice product, 20 pound bagged ice product, etc.). Thus, those of ordinary skill in the art will appreciate the high configurability of the structure of the storage space 60 and the bagged ice product 62.

Figure 3:
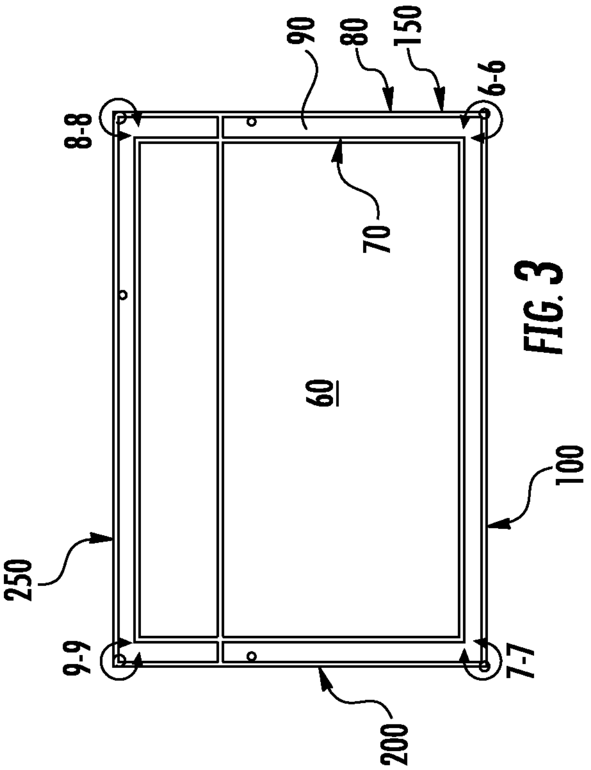
FIG. 3 is a front cross-sectional view of the ice merchandiser of FIG. 1, according to an example embodiment.
Figure 4:
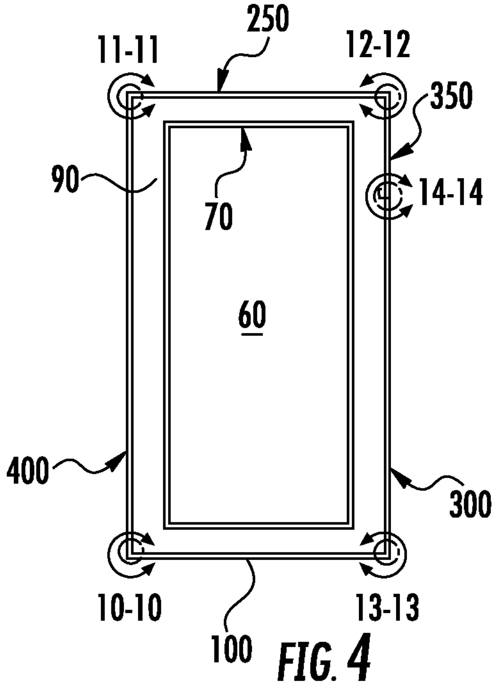
FIG. 4 is a right side cross-sectional view of the ice merchandiser of FIG. 1, according to an embodiment.
Figure 5:
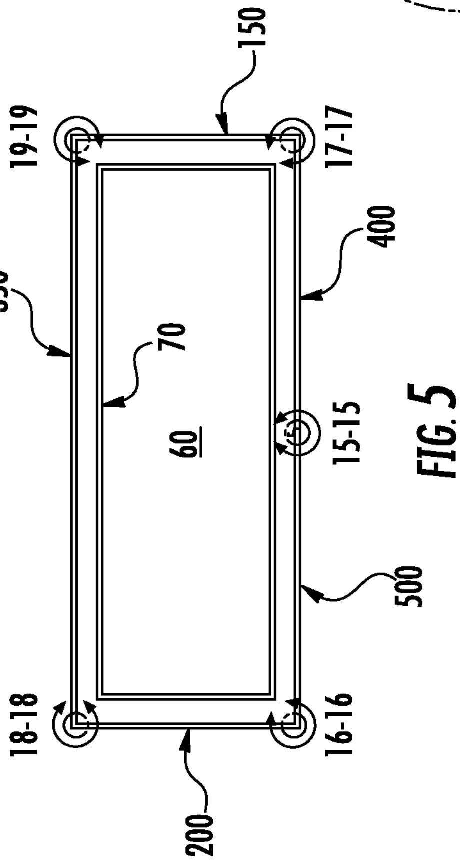
FIG. 5 is a top cross-sectional view of the ice merchandiser of FIG. 1, according to an example embodiment.
Figure 18:
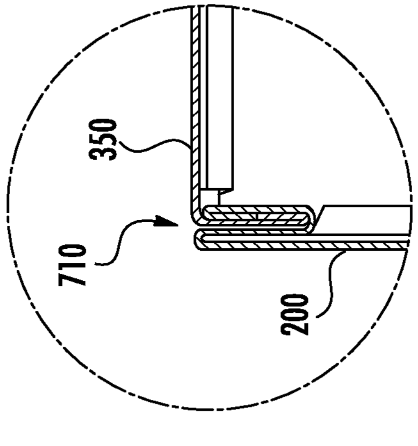
FIG. 18 is a close-up view of the joint between the upper rear panel and the left side panel of the outer cabinet of the ice merchandiser of FIG. 5, according to an example embodiment.

Referring now to FIGS. 3-5, front (FIG. 3), right side (FIG. 4), and top (FIG. 5) cross-sectional views of the ice merchandiser 10 of FIGS. 1-2 are depicted, according to various example embodiments. As shown, the housing 50 is formed from and, therefore, includes an inner cabinet 70 proximate the storage space 60 and an outer cabinet 80 coupled to the inner cabinet 70 to define a separation space 90 (see, e.g., FIG. 3). The inner cabinet 70 (also referred to as inner shell, inner assembly, first shell, and first assembly) and outer cabinet 80 (also referred to as outer shell, outer assembly, second shell, and second assembly) may be constructed from any type of materials for use with the temperature-controlled storage space 60 and ice merchandiser 10 in general. In this regard and in one embodiment, the inner and outer cabinets 70, 80 are constructed from sheet metal. In another embodiment, the inner and outer cabinets 70, 80 are constructed from a combination of metal or metal alloys and composites. In use, the separation space 90 is structured to insulate or partially insulate the storage space 60. In certain embodiments, the separation space 90 may receive an insulating material, such as foam. In other embodiments, the separation space 90 may be left as an air gap, whereby the air acts as an insulating material to maintain or substantially maintain the storage space 60 at a desired temperature.

In the example depicted, the inner cabinet 70, which defines the storage space 60, is constructed from one or more components. In another embodiment, the inner cabinet may be of unitary/monolithic construction. As shown, the inner cabinet 70 includes a plurality of panels (e.g., pieces, parts, components, covers, etc.) that are assembly to form the inner cabinet 70. It should be understood that similar types of joints as described herein with respect to the outer cabinet 80 may be utilized to assemble the inner cabinet 70.

According to the present disclosure, the outer cabinet 80 may be constructed from a series of panels that are coupled together by a series of seams, joints, and/or lock mechanisms without the use of fasteners (e.g., rivets, screws, etc.). As a result, assembly of the outer cabinet 80 may be relatively easier and quicker than conventional cabinets. Further, due to not needing to use various tools to couple panels together, the outer cabinet 80 may be of a relatively higher integrity. For example, the joints of the outer cabinet 80 may be stronger and with smaller gaps between coupled panels because technicians or assembly persons do not need to worry about getting panels square to each other for coupling. Moreover, eliminating or substantially eliminating adhesives and fasteners may also reduce the costs associate with constructing, manufacturing, and/or otherwise assembling the outer cabinet 80.

As described more fully herein, the panels of the outer cabinet 80 are coupled together using joints (also referred to herein as “seams”). The “joints” are created through the interaction of flanges (e.g., projections, protrusions, etc.), bends, channels, and the like that are interconnected with each panel of the joint. In this regard and as used herein, the term “interconnected” means integral, such that in this embodiment, the flanges, bends, and the like of the panel used in the joint are of integral or unitary construction with that panel (i.e., a one-piece component, etc.). Based on the foregoing, the “joints” may be characterized as “fitted joints” due to the engagement (e.g., receiving, overlapping, etc.) of the flanges, bends, and the like that result in each portion of each panel of the joint to be “fitted” together. For example, in the sheet metal construction configuration (i.e., where the panels are constructed from sheet metal), the flanges, bends, and the like of the panel are bent or formed from the panel. Beneficially, the bending of metal imparts strength into the bends to improve the integrity of the joints. Further, because the flanges, bends, and the like of a panel used in a joint are integral with that panel, technicians/assembly-persons need not track and maintain multiple components to create the joint. This may make the assembly relatively easier than conventional cabinet assemblies. However, it should be understood that in an alternate embodiment, the flanges, bends, etc. of a panel of a joint may be a separate component relative to that panel (i.e., not-interconnected with the panel). In this regard, fasteners or other adhesive (e.g., epoxy) or adhesion processes (e.g., welding) may be used to couple or attach the flanges, bends, etc. to a panel to enable creation of a joint. Thus, while the primary disclosure is directed towards unitary construction panels of the outer cabinet (i.e., flanges, bends, and the like interconnected with the panel), this depiction and explanation is not meant to be limiting as it is contemplated that one or more components of the joint may be a separate component relative to the panel.

With the above in mind and still referring to FIGS. 3-5, the outer cabinet 80 includes a base panel 100, a right side panel 150, a left side panel 200, a top panel 250, a first rear panel 300 rotatably or pivotably coupled to a second rear panel 350, and a first front panel 400 coupled to a second front panel 500. The panels may be coupled together to form the outer cabinet 80. Accordingly, the following paragraphs describe and explain the seams or joints used to couple the panels together.

Figure 14:
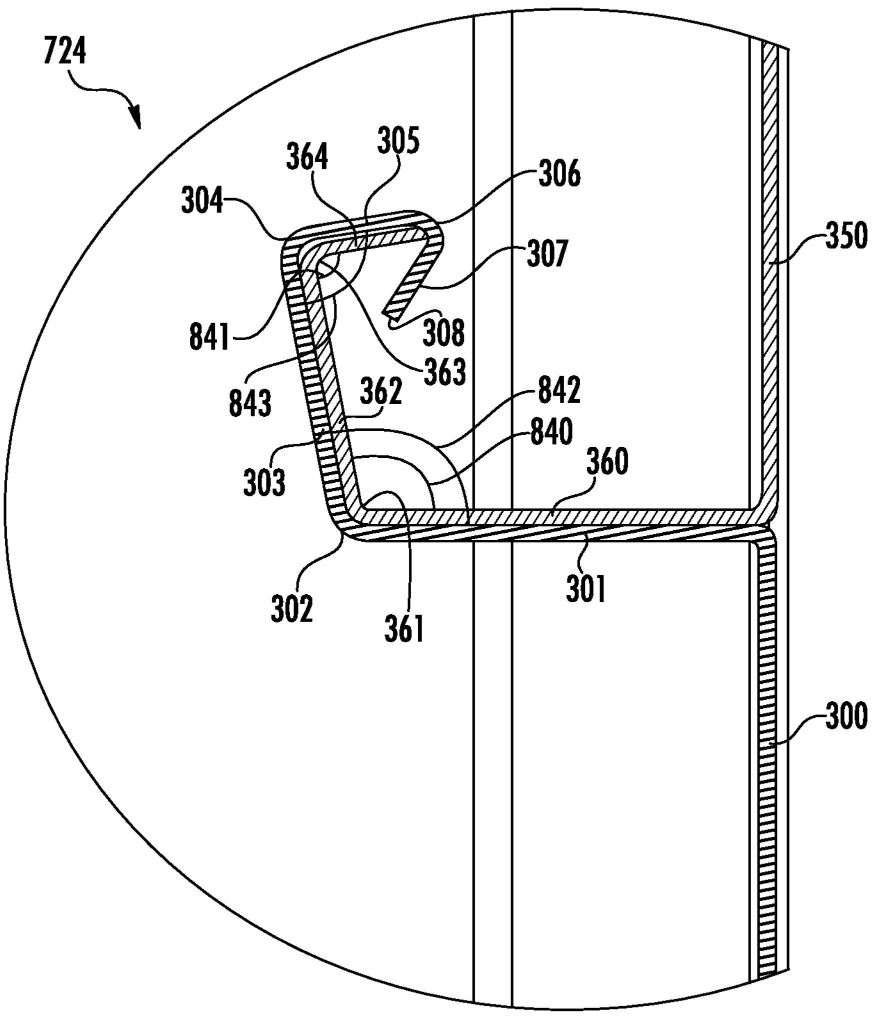
FIG. 14 is a close-up view of the joint between the upper and lower rear panels of the outer cabinet of the ice merchandiser of FIG. 4, according to an example embodiment.

Accordingly, referring now to FIGS. 6-19 in combination with FIGS. 3-5, the joints used for coupling one or more panels of the outer cabinet 80 together are shown, according to various exemplary embodiments. Before turning to the specifics of each joint, as shown, the base panel 100 is coupled to each of the right and left side panels 150, 200, the first rear panel 300, and the front panels 400 and 500. In this regard, the base panel 100 may be produced in one or more standard sizes to accommodate different sized ice merchandisers. Furthermore and in particular, the base panel 201 is coupled to the right panel 150 by a joint 700, coupled to the left panel 200 by a joint 702, coupled to the first rear panel 300 by a joint 704, and coupled to the front panels 400 and 500 by a joint 708 (note that only the joint 708 for coupling the front panel 400 to the base panel 100 is depicted, but the same type of joint is used to couple the front panel 500 to the base panel 100). As shown, in addition to being coupled to the base 100, the right panel 150 is coupled to: the top panel 250 by a joint 708, the first front panel 400 by a joint 718, and the second rear panel 350 by a joint 716. Similarly, in addition to being coupled to the base 100, the left panel 200 is coupled to: the top panel 250 by a joint 714, to the front panel 500 by a joint 712, and to the second rear panel 350 by a joint 710. In addition to being coupled to the base 100 and the right and left panels 150, 200, the front panel 400 is coupled to the top panel 250 by a joint 720 (a similar joint is used to couple the front panel 500 to the top panel 250). In addition to being coupled to the front panel 400 (and front panel 500) and the right and left panels 150, 200, the top panel 250 is coupled to the rear panel 350 by a joint 722. As mentioned above, the rear panel includes a first rear panel 300 (also referred to as a lower rear panel) pivotably coupled to a second rear panel 350 (also referred to as an upper rear panel). As shown in FIG. 14, this coupling is via a joint 724. Finally, in this embodiment, a first front panel 400 is coupled to a second front panel 500 in a co-planar fashion (i.e., when coupled, the panels 400, 500 are substantially co-planar). As shown, coupling of the first front panel 400 to the second front panel 500 is via a joint 726. Advantageously, the joint 726 may be repeated as many times as desired to accommodate different desired length housings 50. Beneficially, such a configuration alleviates the need for custom fabrication of front panels to various desired lengths. While the joints 700-726 (i.e., seams, etc.) are briefly described above, explanation of each joint individually may be explained as follows.

With reference to FIGS. 3-5 and 6, 7, 13, and 18-19, explanation of joints 700, 702, 704, 710, and 716 may be explained as follows. In this regard, joints 700, 702, 704, 710, and 716 are similar in structure and function, except for being applied to different panels. Therefore, while a detailed explanation is explained in regard to joint 700, it should be understood that a similar structure is applied with each of the other like joints 702, 704, 710, and 716.

Generally speaking, each of the joints 700, 702, 704, 710, and 716 includes an inner portion and an outer portion. The outer portion includes a first flange interconnected to a second flange and a hem interconnected to the second flange. The inner portion includes a flange interconnected to a hem. The first two flanges extend perpendicular or substantially perpendicular relative to a horizontal plane, such that the first two flanges of the outer portion are parallel to each other. Further, the flange of the inner portion also extends perpendicular or substantially perpendicular relative to a horizontal plane. When coupled to form the joint, the first two flanges define a space or volume for receiving or at least partly receiving the hem and flange of the inner portion. The hems of the inner and outer portion may selectively engage while the flange of the inner portion may selectively engage with the first flange of the outer portion. Due to these engagements, relative movement between the panels associated with outer portion and the inner portion is substantially prevented. Further and as shown, this joint—i.e., joints 700, 702, 704, 710, and 716—is used to couple a first panel to a second panel at a substantially perpendicular angle (see, e.g., FIG. 6). While joints 702, 704, 710, and 716 are not described in detail due to the overlapping description with joint 700, as shown: in joint 702, the left side panel 200 is the outer portion while the base panel 100 is the inner portion of the joint 702; in joint 704, the first rear panel 300 has the outer portion while the base panel has the inner portion; in joint 710, the left side panel 200 has the outer portion while the second rear panel 350 has the inner portion; and, in joint 716, the right side panel 150 has the outer portion while the second rear panel 350 has the inner portion.

Figure 6:
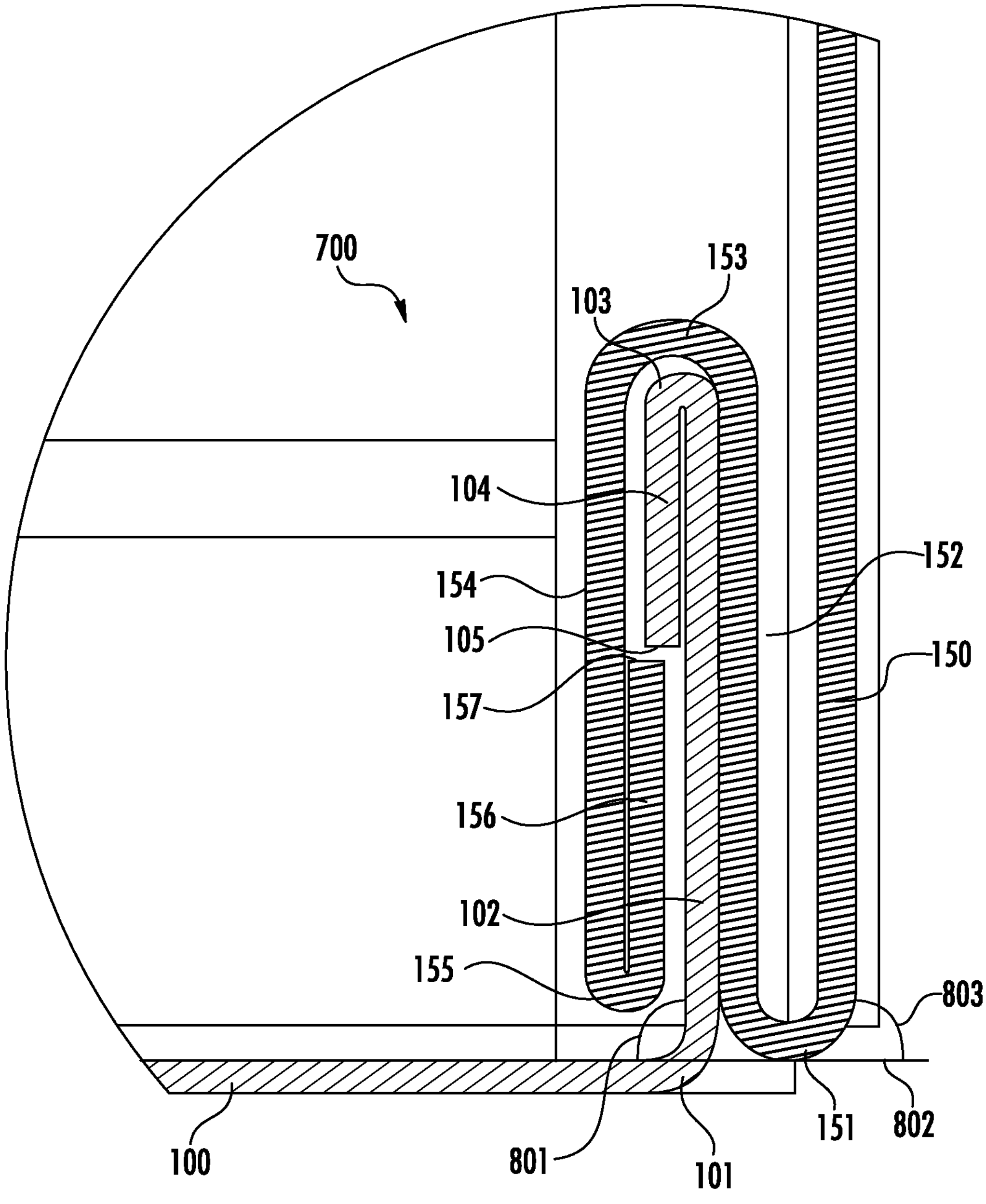
FIG. 6 is a close-up view of the joint between the right side panel and the base panel of an outer cabinet of the ice merchandiser of FIG. 3, according to an example embodiment.
Figure 10:
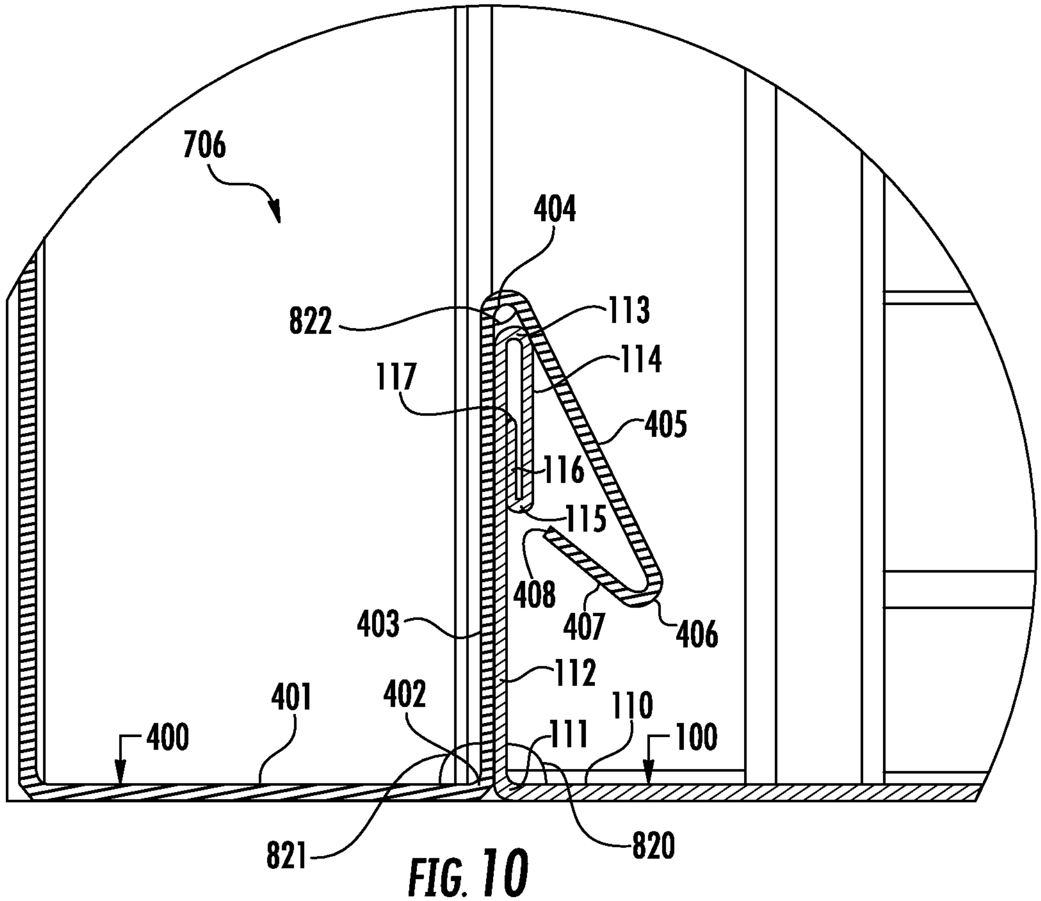
FIG. 10 is a close-up view of the joint between a first front panel and the base panel of the outer cabinet of the ice merchandiser of FIG. 4, according to an example embodiment.

Referring more particularly to FIG. 6, the joint 700 is shown in more detail, according to an example embodiment. The joint 700 couples the right side panel 150 to the base panel 100 in a substantially perpendicular manner. In this regard and as shown, the base panel 100 represents the inner portion while the right side panel 150 represents the outer portion of the joint 700. As shown, the base panel 100 includes a bend 101 interconnected to a flange 102. Via the bend 101, the flange 101 extends towards the storage space 60 at an angle of approximately ninety (90) degrees relative to a horizontal plane (i.e., angle 801 is approximately equal to ninety (90) degrees). The flange 102 is interconnected with another bend 103, which is interconnected with a flange 104 having an end 105. The bend 103, flange 104, and end 105 are collectively referred to as a "hem." In this regard and as used herein, the term "hem" refers to a bent or rolled member (i.e., flange) relative to another member (i.e., flange) (i.e., rolled over on itself). Thus, while the "hems" described herein are described as including a bend, flange, and an end, this description is not meant to be limiting. In this regard, those of ordinary skill in the art will appreciate that the "hem" may also include the flange that interconnects with the bend whereby the bend is interconnected to another flange and the end. There are several types of hems including, but not limited to, a flat hem, an open hem, and an acute hem. A "flat hem," which is shown by the bend 103, flange 104, and end 105 refers to a small, negligible, or in some circumstances no space between the hem portion and the remaining flange portion (more particularly, the flange 104 is spaced a minimal distance from the flange 102 to form a flat hem). In comparison, an "open hem" refers to the flange 104 being still oriented substantially parallel to the flange 102 from the bend 103, but a space is created to separate the two flanges 104 and 102 (e.g., to create a width that allows flexing or biasing of the flange to receive another flange or hem, etc.). An "acute hem" refers to the flange 104 being at an acute angle relative to the flange 102 (an example of an acute hem is shown in FIG. 10 with bend 406, flange 407 and end 408). As shown, a flat hem is created by the bend 103, flange 104, and end 105. Referring to the outer portion of the joint 700, the right side panel 150 includes a bend 151 interconnected with a remainder of the right side panel 150 and a flange 152, which is interconnected with a bend 153, which is interconnected with a flange 154, which is interconnected with a bend 155, which is interconnected with a flange 156 (i.e., projection, flat, etc.) that terminates with an end 157. As shown, the bend 155, flange 156, and end 157 form a hem. In particular, a flat hem is formed from the bend 155, flange 156, and end 157.

As shown, the right side panel 150 portion of the joint 400 includes two (2) flanges that are substantially vertically oriented (i.e., ninety-degrees) relative to a horizontal plane: flange 152 and flange 154. Further and as shown, the bend 153 creates a space, void, or opening between the flanges 152 and 154. Additionally, the hem of the outer portion is disposed within the space. In use, the space is sized to receive, at least, partly the inner portion of the joint 700. Based on the foregoing, characteristics, features, and benefits of the joint 700 and (joints 702, 704, 710, and 716) may be described as follows.

As shown, at least one flange portion of each panel of the joint 700 are engaged or in an abutment condition (i.e., touching or close to touching such that even very small movements of the panels result in touching). In particular, the flange 152 of the right side panel 150 is in an abutment condition with the flange 102 of the base panel 100. As also shown, the flange 102 and hem of the base panel 100 are at least partly received in the spaced created by the flanges 152 and 154 and bend 153 of the right side panel 150. As mentioned above, the hem of the outer portion is also disposed at least partly within this space. In this regard, the outer portion at least partly surrounds the inner portion. In operation, the hem of the outer portion (i.e., bend 155, flange 156, and end 157) and the hem of the inner portion (i.e., bend 103, flange 104, and end 105) are proximate to each other. More particularly, the ends 105 and 157 are proximate to each other and in selective engagement with each other (i.e., selectively contacting each other). In this regard and while FIG. 6 depicts a gap or separation distance between the ends 105 and 157, in other embodiments and in certain situations, the ends 105 and 157 may be engaged (i.e., touching).

Based on the foregoing, operation of the joint 700 (and joints 702, 704, 710, and 716) may be described as follows. Once the joint 700 is formed, like the depiction in FIG. 6, engagement of the flange and hem of the inner portion with the flanges and hem of the outer portion prevent or restrict relative movement of the panels 100 and 150. In particular, engagement or selective engagement of the flange 102 of the base panel 100 with the flange 152 and hem of the right side panel 150, engagement or selective engagement of the flange 154 with the hem of the inner portion (e.g., flange 104), and engagement or selective engagement of the flange 102 with the hem of the outer portion (e.g., the flange 156) substantially prevents relative horizontal movement between the panels 100 and 150 (based on the viewpoint depicted in FIG. 6). In comparison, engagement or selective engagement of the ends 105 and 157 as well the bend 103 with the bend 153 may prevent or substantially prevent relative vertical movement of the panels 100 and 150. Thus, the joint 700 is useful in coupling panels together in a perpendicular manner while still preventing or substantially preventing relative vertical and horizontal movement between the panels.

It should be understood that in other embodiments, various modifications may be made to the joint 700 (and joints 702, 704, 710, and 716) without departing from the spirit and scope of the present disclosure. For example, in another embodiment, the ends 105 and 157 may be angled rather than planar like shown in FIG. 6. As another example, additional flanges may be incorporated with the outer portion of the joint 700 (e.g., another flange 152, bend 153, flange 154, and hem combination). In this example, technicians may sever a portion of the outer portion to reuse the remaining part of the outer portion to, in turn, reuse the panel. In this regard, the panel may be re-used in the same or a different enclosure. Thus, those of ordinary skill in the art will appreciate the configurability of the joint 700 and joints 702, 704, 710, and 716, without departing from the spirit and scope of the present disclosure.

Figure 9:
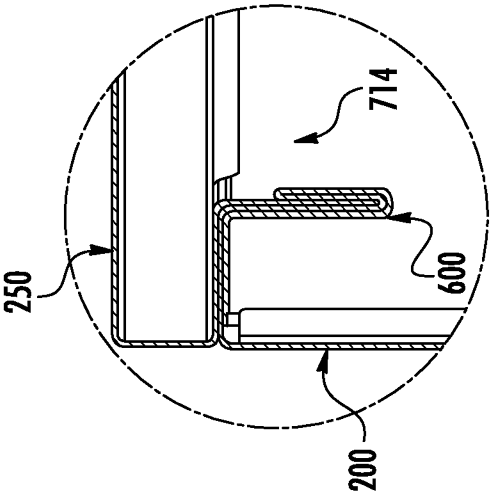
FIG. 9 is a close-up view of the joint between the top panel and the left side panel of the outer cabinet of the ice merchandiser of FIG. 3, according to an example embodiment.
Figure 7:
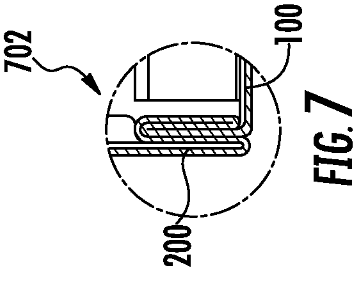
FIG. 7 is a close-up view of the joint between the left side panel and the base panel of the outer cabinet of the ice merchandiser of FIG. 3, according to an example embodiment.
Figure 8:
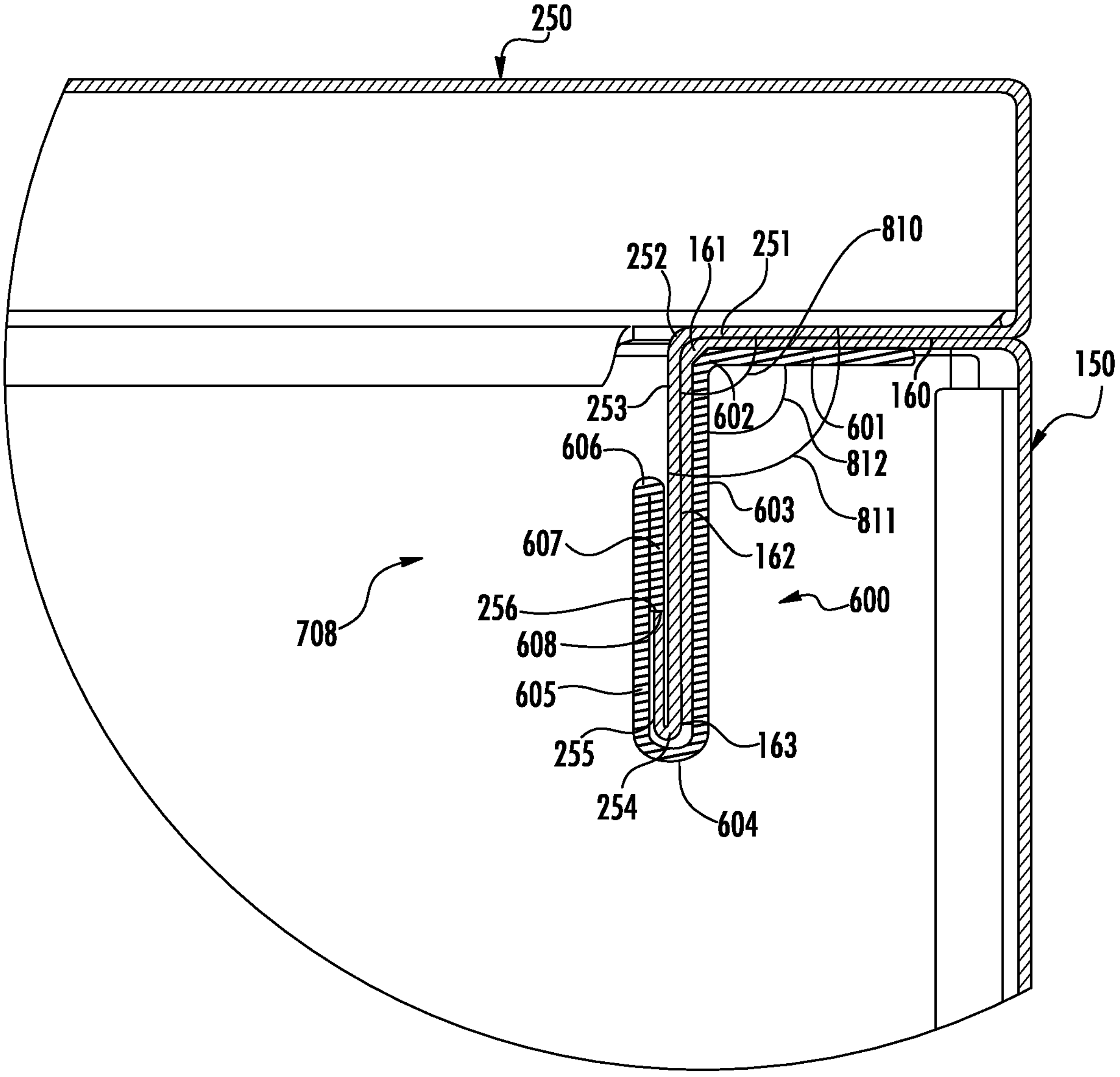
FIG. 8 is a close-up view of the joint between the top panel and the right side panel of the outer cabinet of the ice merchandiser of FIG. 3, according to an example embodiment.

Turning now to FIGS. 8-9, explanation of joints 708 and 714 may be explained as follows. In this regard, joints 708 and 714 are similar in structure and function, except being applied to different panels. Therefore, while a detailed explanation is explained in regard to joint 708, it should be understood that a similar structure is applied with the joint 714. Relative to the other joints used with the outer cabinet 80, joints 708 and 714 use an external component relative to the coupled panels to form or create the joint. The external component is referred to herein as a slide lock or slide channel. Generally speaking, the joint 708 (and joint 714) includes two panels and the slide channel. One panel includes a flange while the other panel includes a flange and a hem. The flanges of each panel are disposed parallel to each other, such that they may engage in a flat or substantially flat manner. Further, the slide channel includes parallel flanges that define a channel and a hem extending from one of the flanges. In operation, the flanges of the panels are at least partly received in the channel while the hem of the slide channel may selectively engage with the hem of the panel. Due to these engagements, relative movement between the coupled panels is substantially prevented.

Referring more particularly to FIG. 8, the joint 708 is shown in greater detail, according to an example embodiment. As shown, the joint 708 includes a slide channel 600, which couples the right side panel 150 to the top panel 250. In regard to the right side panel 150 portion of the joint 708, as shown, a flange 251 is interconnected by a bend 252 to another flange 253 that terminates with an end 254. As shown, the flange 251 is at an angle 810 with the flange 253. In the example shown, the angle 810 is approximately equal to ninety (90) degrees. Hence, the flange 253 extends away from the flange 251 towards the storage space 60 in a substantially perpendicular manner. The end 254 corresponds to a face that is substantially planar in nature. Of course, in other embodiments, any type of configuration of the end 254 may be used (e.g., angled, etc.). Regarding the top panel 250 portion of the joint 708, the top panel 250 includes a flange 251 interconnected to a bend 252, which is interconnected to another flange 253, which is interconnected to a bend 254, a flange 255, and an end 256. The bend 254, flange 255, and end 256 represent a hem. In this embodiment and as shown, the hem is a flat hem. Further, the flange 251 is at an angle 811 with the flange 253. In the example shown, the angle 811 is approximately equal to ninety (90) degrees, such that the flange 253 extends away from the flange 251 towards the storage space 60. Further, the flange 253 extends in a parallel fashion to the flange 162. As also shown and relative to the flange 162 of the right side panel 150, the hem (i.e., the bend 254, flange 255, and end 256) is oriented away from the flange 162 of the right side panel 150, such that the hem is away from/not engaged with the flange 162. In comparison, the flange 162 of the right side panel 150 and the flange 253 of the top panel 250 are in an abutment or engaged condition.

As alluded to above, the slide channel 600 is structured to hold or substantially hold, couple, and retain the top panel 250 to the right side panel 150 in the joint 708. As shown, the slide lock 600 includes a flange 601 interconnected to a bend 602, which is interconnected to another flange 603, which is interconnected to a bend 604, a flange 605, a bend 606, a flange 607, and an end 608. The bend 606, flange 607, and end 608 represent a hem of the slide channel 600. In the example shown, the hem is a flat hem. Of course, in other embodiments, a different type hem may be used, such as an open hem. As shown, the flange 603 extends away from the flange 601 towards the storage space 60 at an angle 812. In the example shown, the angle 812 is approximately equal to ninety (90) degrees. Thus, angles 810, 811, and 812 are equal or substantially equal to each other to enable relatively tight/adjacent positioning. As also shown, the hem, flange 605, bend 604, and flange 603 form or define a channel. In the embodiment depicted, the channel is u-shaped. Further, the channel is sized (i.e., of a width from the hem and flange 605 to and the flange 603) to at least partly receive the flange 162 of the right side panel 150 as well as the flange 253 and hem (i.e., bend 254, flange 255, and end 256) of the top panel 250. Thus, the channel of the slide channel 600 substantially surrounds the flange 162, flange 253, and hem of the top panel 250 to hold, retain, or otherwise couple the top panel 250 to the right side panel 150.

In use, the slide channel 600 prevents relative movement between the top panel 250 and the right side panel 150 by selective engagement of the hems of the top panel 250 and slide channel 600, and selective engagement of the flanges 162 and 253 with the slide channel 600. To form the joint 708, the flange 253 and the flange 162 may be aligned and the slide channel 600 inserted over the flanges 253, 162, such that the flanges 253 and 162 are at least partly received in the channel of the slide channel 600. According to one embodiment, flexion of the hem away from the flange 603 (during coupling) may occur due to the hem engaging with the hem of the top panel 250. After the hem of the slide channel 600 is moved above the hem of the top panel 250 hem, the hem and flange 605 may flex or spring back towards the flange 603 and create an audible noise (e.g., a snap, click, etc.). Such an audible noise may beneficially serve to indicate that the slide channel 600 is in a locked position. In turn, assembly persons may recognize that the joint 708 is formed. To de-couple the top panel 250 from the right side panel 150, the slide lock 600 is slid or translated into or out-of-the page (based on the view point depicted in FIG. 8); hence, the moniker "slide lock." Applicant notes that coupling the top panel 250 to the right side panel 150 may also be achieve in similar manner to the aforementioned de-coupling process (e.g., the slide lock 600 may be slid, translated, or otherwise moved to form the joint 708).

As also shown, the top panel 250 is shown to define a cavity or space proximate the flange 251 and away from the slide channel 600. This cavity may be useful in at least one of providing additional space for various components or plumbing, providing space to receive additional insulation, and/or imparting strength to the panel 250. The front panel 400 is shown to include a similar type of cavity or space (see FIG. 10, the space defined by the flanges 401 and 403). Of course, in other embodiments, the panels may be substantially co-planar in nature and not include such cavities or spaces.

Additionally, it should be understood that similar types of modifications as mentioned above with joint 700 may be applied/used with joints 708 and 714. For example, the ends of the hems may be a different shape than planar like shown. Thus, those of ordinary skill in the art will appreciate the high configurability of the joint 708 and 714, with all such variations intended to fall within the scope of the present disclosure.

Figure 11:
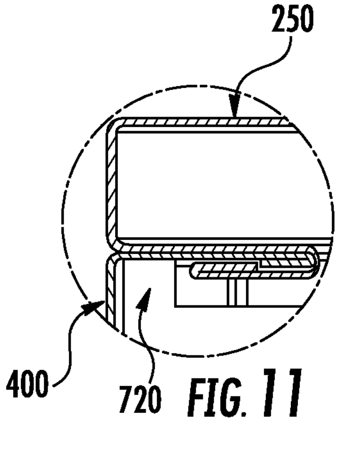
FIG. 11 is a close-up view of the joint between the top panel and the first front panel of the outer cabinet of the ice merchandiser of FIG. 4, according to an example embodiment.
Figure 13:
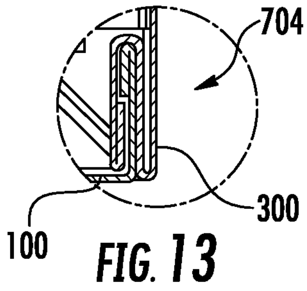
FIG. 13 is a close-up view of the joint between the base panel and the lower rear panel of the outer cabinet of the ice merchandiser of FIG. 4, according to an example embodiment.
Figure 19:
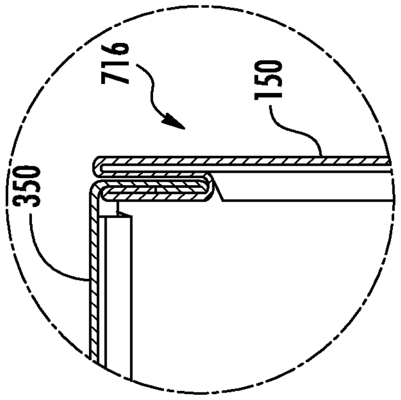
FIG. 19 is a close-up view of the joint between the upper rear panel and the right side panel of the outer cabinet of the ice merchandiser of FIG. 5, according to an example embodiment.
Figure 12:
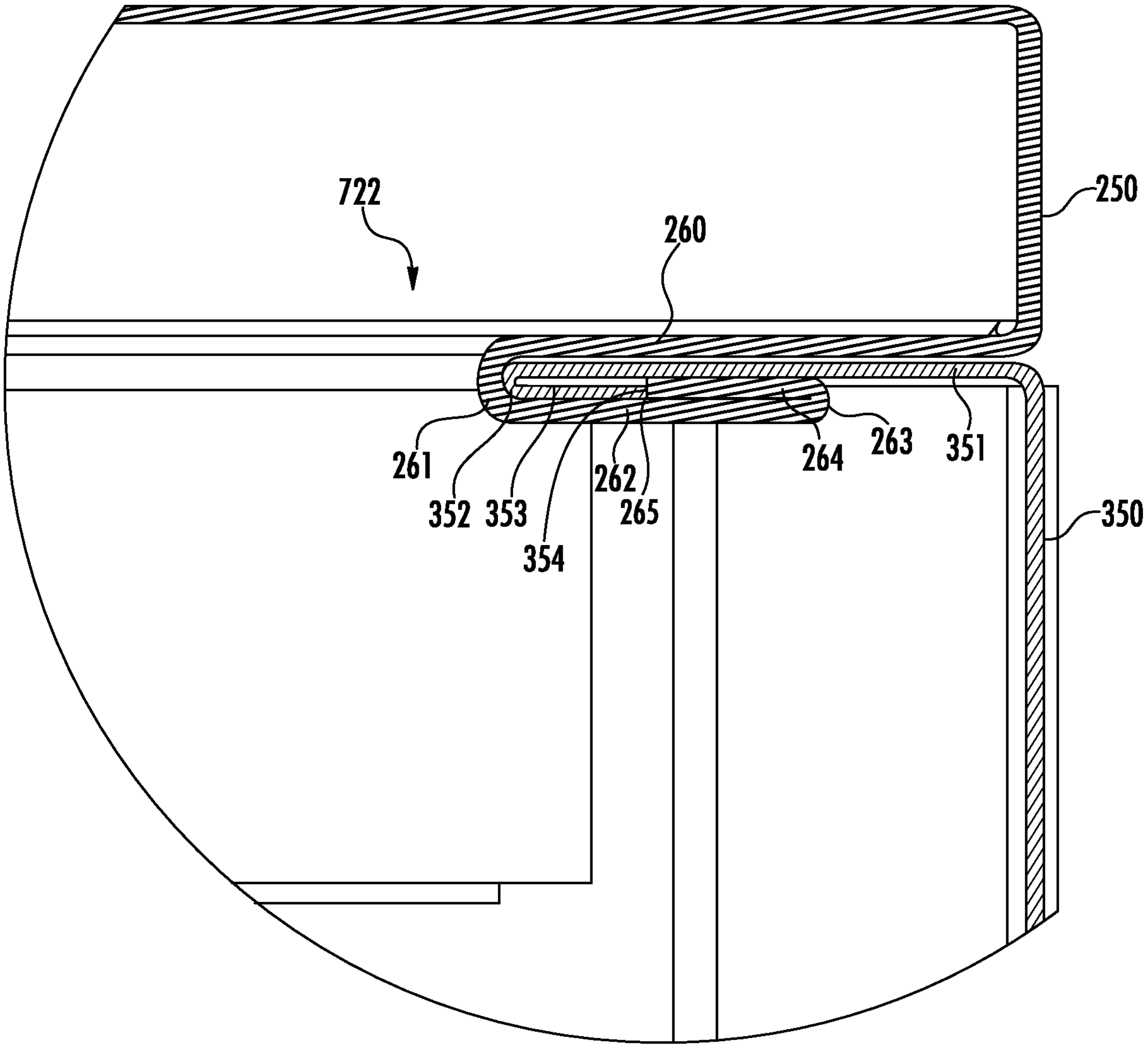
FIG. 12 is a close-up view of the joint between the top panel and the upper rear panel of the outer cabinet of the ice merchandiser of FIG. 4, according to an example embodiment.

With reference to FIGS. 4 and 11-12, explanation of joints 720 and 722 may be explained as follows. As shown, joint 720 is used to couple the top panel 250 to the front panel 400 while the joint 722 is used to couple the top panel 250 to the second or upper rear panel 350. Joints 720 and 722 are similar in structure and function, except being applied to different panels. Therefore, while a detailed explanation is explained in regard to joint 722, it should be understood that a similar structure is applied with the joint 720.

Generally speaking, joints 720 and 722 are substantially similar to joint 700, except joints 720 and 722 are relatively simpler by excluding the additional bend and flange portion of the outer portion of the joint 700. In this regard and generally speaking, joints 720 and 722 include an one panel having an outer portion and another panel having or interconnected with an inner portion. The joint 720 (and joint 722) is used to couple panels together at a right angle or substantially right angle (i.e., perpendicular to each other). To accomplish this coupling, the outer portion includes a first flange interconnected to a second flange interconnected, and a hem interconnected to the second flange. The first and second flanges are spaced apart from one another to form a channel or receiving space. The inner portion includes a flange interconnected with a hem. The flange and hem of the inner portion are at least partly received in the channel of the outer portion, whereby the hems of the inner and outer portions may selectively engage to restrict relative movement and couple the panels together.

More particularly, and with reference to FIG. 12, the outer portion of the joint 722 is formed from the top panel 250, which includes a flange 260 interconnected by a bend 161 to another flange 262, which is interconnected to a hem having a bend 263, flange 264, and an end 265. The hem, flange 262, bend 261, and flange 260 define a channel that is structured to receive the inner portion (i.e., the bend 262 separates the flange 260 from the flange 262 and hem to enable reception of the inner portion). The inner portion of the joint 722 represents the upper rear panel 350 and includes a flange 351 interconnected to a hem having a bend 352, flange 353, and an end 354. In the embodiment depicted, the hem of the top panel 250 and the hem of the upper rear panel 350 are structured as flat hems. Beneficially, utilizing a flat hem decreases the amount of space occupied by the joint 722 to enable a relatively tighter connection between the panels.

As mentioned above, in operation, the channel of the outer portion of the joint 722 is structured to receive or at least partly receive the inner portion of the joint 722. In particular, the flange 351 of the top rear panel 350 is in an abutment condition or engaged with the flange 260 and the hem of the top panel 250 (i.e., bend 263, flange 264, and end 265) while the hem of the upper rear panel 350 is engaged with the flange 262, bend 261, and flange 260. In this regard, the hems may selectively engage while the bends may selectively engage to prevent relative horizontal movement (based on the view depicted in FIG. 12), the hems may selectively engage to lock or couple the panels 250, 350 to each other, and the inner and outer portions generally may engage to prevent relative vertical movement. As a result, a relatively strong joint is created. Beneficially, such characteristics are achieved without the use of fasteners and/or adhesion processes.

Turning now to FIGS. 4 and 10, explanation of the joint 706 may be explained. As shown and mentioned above, the joint 706 is used to couple the front panel 400 to the base panel 100. A similar joint is used to couple the front panel 500 to the panel 100 despite not being shown. Generally speaking, the joint 706 includes an inner portion and an outer portion. In operation, the joint 706 couples two panels together at a right or substantially right angle (i.e., perpendicular to each other). The inner portion includes a flange extending towards the storage space and a double hem interconnected to the flange. Relative to the "flat hem," "open hem," and "acute hem" configurations described above, the "double hem" refers to an edge rolled onto itself (like the flat or open hem) plus the end of that edge rolled or bent back towards the first bend or roll to form a loop (the loop can be circle or oval shaped). The double hem may be useful to provide additional strength to the joint. The outer portion includes a first flange interconnected to a second flange by a bend, and a hem interconnected to the second flange. According to one embodiment, the first and second flanges are at an acute angle and the hem is an acute hem. When coupled, the first and second flanges of the outer portion at least partly surround and contact the flange and double hem of the inner portion. Further and in one instance, the acute hem is spaced apart from the double hem, but capable of engaging with the double hem to prevent relative movement between the panels.

With the above in mind, explanation of the joint 706 may be described as follows. As shown, the inner portion includes a flange 110 interconnected to a flange 112 by a bend 111. The flange 112 extends away from the flange 110 towards the storage space 60. The bend 111 forms an angle 820 between the flanges 112 and 110. According to the embodiment depicted, the angle 820 is approximately equal to ninety (90) degrees, such that the flanges 112 and 110 are substantially perpendicular to each other. The flange 112 is interconnected to a hem and, in particular, a double hem. The double hem includes a bend 113, flange 114, bend 115, flange 116, and end 117. In comparison, the outer portion includes a flange 401 interconnected to another flange 403 by a bend 402. The flange 403 extends away from the flange 401 towards the storage space 60. The bend 402 forms an angle 821 between the flanges 401 and 403. In the example depicted, the angle 821 is approximately equal to ninety (90) degrees, such that the flanges 401 and 403 are substantially perpendicular to each other. The flange 403 is interconnected to a bend 404, which is interconnected to a flange 405, which is interconnected to a hem including a bend 406, flange 407, and end 408. As shown, via the bend 404, the flanges 403 and 405 are at an angle 822 relative to each other. In this example, the angle 822 is an acute angle (i.e., 0 degrees<angle 822<90 degrees). As a result of the acute angle, the flange 403, bend 404, and flange 405 form an opening structured to receive the inner portion of the joint 706. Further and in this example, the hem of the inner portion (i.e., bend 406, flange 407, and end 408) is an acute hem. That is to say and in other words, the angle between the flange 407 and the flange 405 by the bend 406 is an acute angle. Based on the foregoing, operation of the joint 706 may be described as follows.

In use, the flange 403 and flange 112 are in engaged or in an abutment condition (i.e., touching). Because each of these flanges extend vertically in a substantially parallel manner (i.e., towards the storage space 60), the flanges 403 and 112 may form a relatively tight connection or bond. Additionally, the flange 403, bend 404, and flange 405 then at least partly receive and surround the double hem portion of the inner portion of the joint 706. In particular and as shown, the flange 405 is engaged with the double hem of the inner portion of the joint 706. In another embodiment, the flange 405 may be separated by a gap from the double hem portion. Nonetheless, due to the engagement, the inner portion may be considered locked in relative to the outer portion. Accordingly, while the end 408 is shown to be at a distance/separation gap from the double hem portion, selective engagement by the end 408 and the double hem portion prevents or substantially prevents relative tilting between the front panel 400 to the base panel 100. As a result of the engagements, once foam or another insulating material is provided/inserted (when foam or an insulating material is used), the expansion of the insulating material cannot or substantially cannot creep into various spaces to the separate the joint. Thus, a relatively strong seam or joint is created with minimal gaps.

Figure 17:
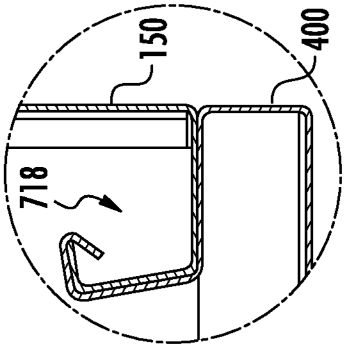
FIG. 17 is a close-up view of the joint between the first front panel and the right side panel of the outer cabinet of the ice merchandiser of FIG. 5, according to an example embodiment.
Figure 16:
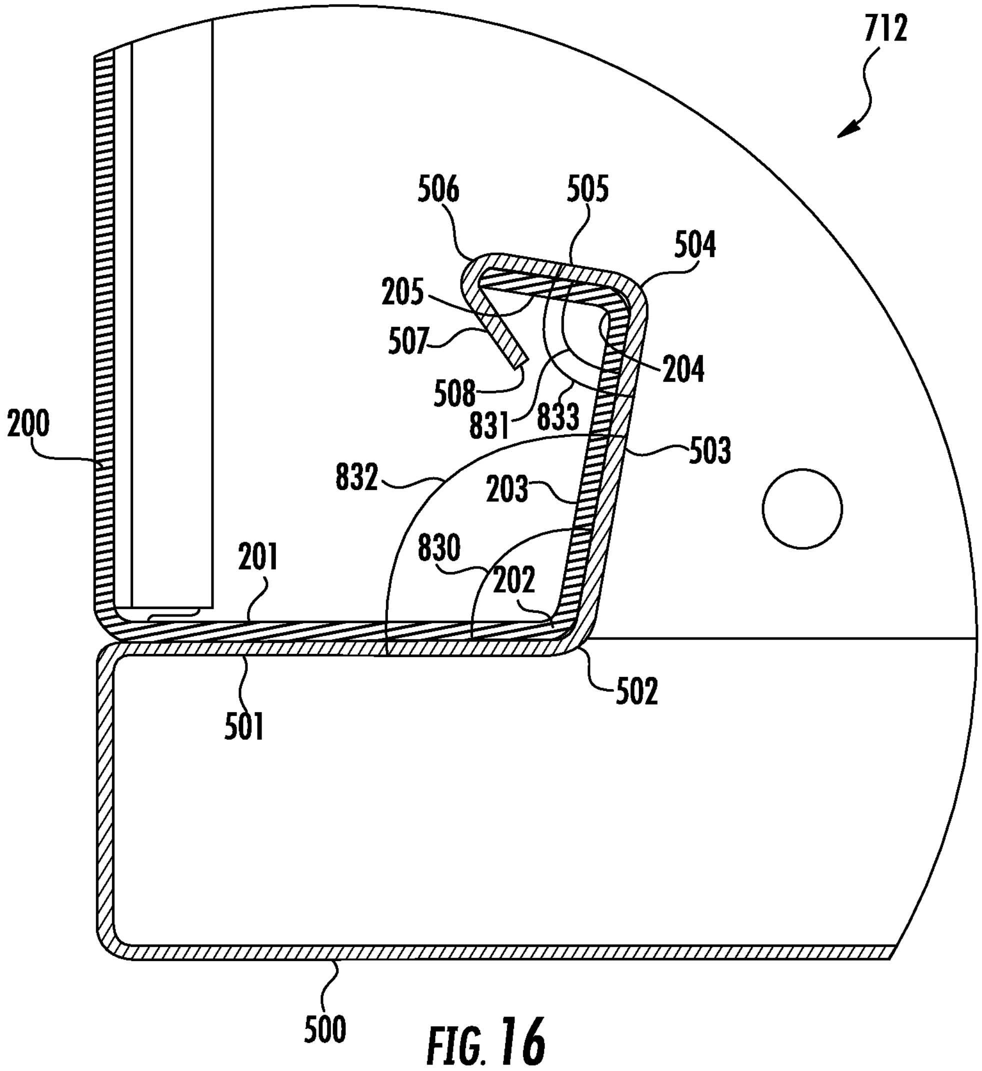
FIG. 16 is a close-up view of the joint between the second front panel and the left side panel of the outer cabinet of the ice merchandiser of FIG. 5, according to an example embodiment.

Turning now to FIGS. 5 and 16-17, explanation of the joints 712 and 718 may be explained as follows. As shown, joint 712 is used to couple the left side panel 200 to the front panel 500 while the joint 718 is used to couple the right side panel 150 to the front panel 400. In a situation where only one front panel is used, joint 712 would represent the coupling of left side panel 200 to the front panel 400. Joints 712 and 718 are similar in structure and function, except being applied to different panels. Therefore, while a detailed explanation is explained in regard to joint 712, it should be understood that a similar structure is applied with the joint 718.

Generally speaking, the joints 712 and 718 include an inner portion and an outer portion. The inner portion includes a first flange interconnected by a first bend to a second flange, which is interconnected by a second bend to a third flange. According to one embodiment, via the first bend, the first and second flanges are at an obtuse angle relative to one another. Via the second bend, the second and third flanges are at an approximately ninety (90) degree angle relative to one another. In other embodiments, different angle configurations may be used. The outer portion includes a first flange interconnected to a second flange by a first bend, a second flange interconnected to a third flange by a second bend, and a hem. In one embodiment, via the first bend, the first and second flanges of the outer portion are at an obtuse angle relative to one another. In one instance, the obtuse angle matches or substantially matches the obtuse angle between the first and second flanges of the inner portion. Similarly, the second and third flanges are at an angle to one another as well and, in one embodiment, the angle between the second and third flanges matches or substantially matches the angle between the second and third flanges of the inner portion (i.e., approximately equal to ninety degrees in this case). Furthermore and in one embodiment, the hem is structured as an acute hem. In operation, due to the matching or substantially matching of angles, the first, second, and third sets of flanges of the inner and outer portions may be engaged while the acute hem may at least partly surround and engage the third hem of the inner portion. As a result of the matching and acute hem engagement, a relatively tight connection with minimal gaps is created to couple the panels together. Furthermore and due to the coupling, the first panel and second panel (associated with the inner and outer portions) are coupled at a right or approximately right angle to each other (i.e., are perpendicular to each other).

Referring now more particularly to FIG. 16, the details of the joint 712 are shown in more detail, according to an example embodiment. As shown, the outer portion of the joint 712 represents the front panel 501 portion while the inner portion of the joint 712 represents the left side panel 200 portion. The inner portion—i.e., left side panel 200 portion—includes a flange 201 interconnected by a bend 202 to a flange 203, which is interconnected by a bend 204 to another flange 205. The flange 201 extends in a direction towards the storage space 60. Via the bend 202, the flanges 201 and 203 are at an angle 830 relative to each other. In one embodiment and in the example depicted, the angle 830 is an obtuse angle. Thus, in this case, the flange 203 extends further towards the storage space 60 than the flange 201. Via the bend 204, the flanges 203 and 205 are at an angle 831 relative to each other. In this example, the angle 831 is approximately equal to ninety (90) degrees. In comparison, the outer portion includes a flange 501 interconnected by a bend 502 to a flange 503, which is interconnected by a bend 504 to another flange 505. The flange 505 is interconnected to a hem including a bend 506, flange 507, and end 508. In the example shown, the hem is an acute hem. In other embodiments, a different hem configuration may be used. The flange 501 extends in a direction towards the storage space 60. Via the bend 502, the flanges 501 and 503 are at an angle 832 relative to each other. In one embodiment and in the example depicted, the angle 832 is an obtuse angle. Thus, in this case, the flange 503 extends further towards the storage space 60 than the flange 501. Via the bend 504, the flanges 503 and 505 are at an angle 833 relative to each other. In this example, the angle 833 is approximately equal to ninety (90) degrees. Thus, the bends 202 and 204 of the inner portion and the bends 502 and 504 create angles that are equal to or substantially equal to each other. As a result, the inner portion may mate or engage with the outer portion in a fairly tight manner. Of course in other configurations, different angle designations may be utilized.

In operation, the outer portion is shown to at least partly receive or surround the inner portion. In particular and in the coupled position, the flange 501 is engaged with or in an abutment condition with the flange 201, the bend 502 is engaged with or in an abutment condition the bend 202, the flange 503 is engaged with or in an abutment condition with the flange 203, the bend 504 is engaged with or in an abutment condition with the bend 204, and the flange 505 is engaged with or in an abutment condition with the flange 205. Further, the hem of the outer portion serves to at least partly surround the flange 205 to lock or retain the joint 712 to prevent or substantially relative movement or de-coupling between the panels.

Turning now to joints 724 and 726, joint 724 is shown to couple the lower rear panel 300 to the upper rear panel 350 while joint 726 is used to couple together the front panel 400 to the front panel 500. It should be understood that joints 724 and 726 are optional, such that not all embodiments/applications of the present disclosure will include these joints. That is to say, in other embodiments, only one front panel may be used such that the joint 726 is not needed and only one rear panel may be used such that the joint 724 is not needed.

Based on the foregoing and with reference to FIGS. 4 and 14, explanation of the joint 724 may be explained as follows. Generally speaking, the joint 724 includes an inner portion and an outer portion. The inner portion includes a first flange interconnected by a first bend to a second flange, which is interconnected by a second bend to a third flange. According to one embodiment, via the first bend, the first and second flanges are at an obtuse angle relative to one another. Via the second bend, the second and third flanges are at an approximately ninety (90) degree angle relative to one another. In other embodiments, different angle configurations may be used. The outer portion includes a first flange interconnected to a second flange by a first bend, a second flange interconnected to a third flange by a second bend, and a hem. In one embodiment, via the first bend, the first and second flanges of the outer portion are at an obtuse angle relative to one another. In one instance, the obtuse angle matches or substantially matches the obtuse angle between the first and second flanges of the inner portion. Similarly, the second and third flanges are at an angle to one another as well and, in one embodiment, the angle between the second and third flanges matches or substantially matches the angle between the second and third flanges of the inner portion (i.e., approximately equal to ninety degrees in this case). Furthermore and in one embodiment, the hem is structured as an acute hem. Therefore, in operation and due to the matching or substantially matching of angles, the first, second, and third sets of flanges of the inner and outer portions may be engaged while the acute hem may at least partly surround and engage the third flange of the inner portion. As a result of the matching and acute hem engagement, a relatively tight connection with minimal gaps is created to couple the panels together. Furthermore and due to the coupling, the lower rear panel 300 and upper rear panel 350 are coupled in a substantially co-planar manner (as compared to a perpendicular manner like shown by the joint 712).

Referring more particularly to FIG. 14, the joint 724 is used to couple a lower rear panel 300 to the upper rear panel 350. Typically, sheet metal panels come in standard sizes. By utilizing joint 724, several advantages may be provided. First, custom or special order rear panels for the housing 50 may be avoided. Second, the panels may be made relatively smaller than a typical maximum size, which increases the ease of handling of the rear panel. Thus, the two-piece rear piece may be ergonomically beneficially.

As shown and mentioned above, the joint 724 includes an inner portion, representing the upper rear panel 350 part of the joint 724, and an outer portion, representing the lower rear panel 300 part of the joint 724. The inner portion includes a flange 360 interconnected by a bend 361 to a flange 362, which is interconnected by a bend 363 to another flange 364. The flange 360 extends in a direction towards the storage space 60. Via the bend 361, the flanges 360 and 362 are at an angle 840 relative to each other. In one embodiment and in the example depicted, the angle 840 is an obtuse angle. Thus, in this case, the flange 362 extends further towards the storage space 60 than the flange 360. Via the bend 364, the flanges 362 and 364 are at an angle 841 relative to each other. In this example, the angle 841 is approximately equal to ninety (90) degrees. In comparison, the outer portion includes a flange 301 interconnected by a bend 302 to a flange 303, which is interconnected by a bend 304 to another flange 305. The flange 305 is interconnected to a hem including a bend 306, flange 307, and end 308. In the example shown, the hem is an acute hem. In other embodiments, a different hem configuration may be used. The flange 301 extends in a direction towards the storage space 60. Via the bend 302, the flanges 301 and 303 are at an angle 842 relative to each other. In one embodiment and in the example depicted, the angle 842 is an obtuse angle. Thus, in this case, the flange 303 extends further towards the storage space 60 than the flange 301. Via the bend 304, the flanges 303 and 305 are at an angle 843 relative to each other. In this example, the angle 843 is approximately equal to ninety (90) degrees. Thus, the bends 302 and 361 and the bends 304 and 363 create angles that are equal to or substantially equal to each other. As a result, the inner portion may mate or engage with the outer portion in a fairly tight manner.

Based on the foregoing, operation of the joint 724 may be described as follows. The outer portion is shown to at least partly receive or surround the inner portion. In particular and in the coupled position, the flange 301 is engaged with or in an abutment condition with the flange 360, the bend 302 is engaged with or in an abutment condition the bend 361, the flange 303 is engaged with or in an abutment condition with the flange 362, the bend 304 is engaged with or in an abutment condition with the bend 363, and the flange 305 is engaged with or in an abutment condition with the flange 365. Further, the hem of the outer portion serves to at least partly surround the flange 364 to lock or retain the joint 724 to prevent or substantially relative movement or de-coupling between the panels. It should be understood that it is contemplated that the same or similar type of joint may be oriented along the vertical plane in other embodiments, such that the rear panel would comprise left and right side rear panels rather than upper and lower rear panels.

Figure 15:
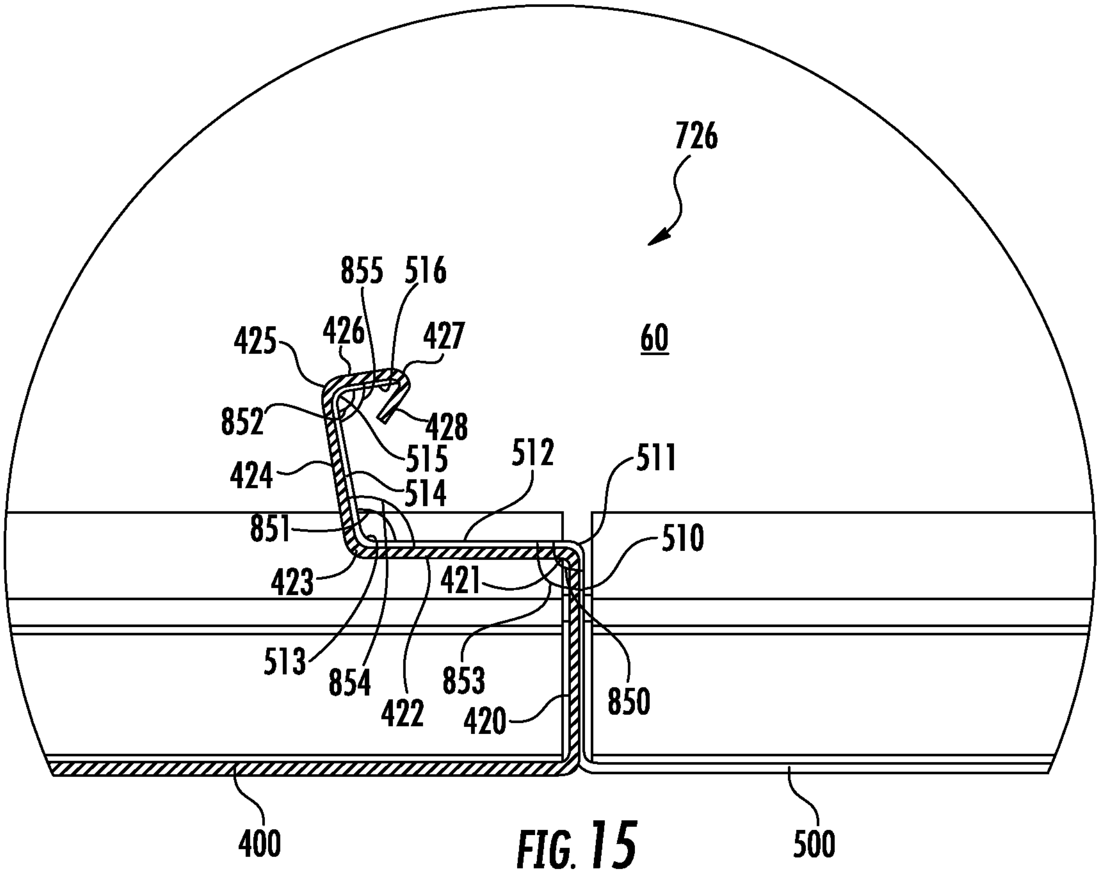
FIG. 15 is a close-up view of the joint between the first front panel and a second front panel of the outer cabinet of the ice merchandiser of FIG. 5, according to an example embodiment.

Turning now to FIGS. 5 and 15, the joint 726 may be explained as follows. As mentioned above, the joint 726 is used to couple a front panel to another front panel in a substantially co-planar nature to increase a total length of the coupled front panels. Generally speaking, the joint 726 includes an inner portion and an outer portion. The inner portion includes a first flange interconnected by a first bend to a second flange, which is interconnected by a second bend to a third flange, which is interconnected by a third bend to a fourth flange. According to one embodiment, via the first bend, the first and second flanges are at an approximately ninety (90) degrees angle relative to one another while via the second bend, the second and third flanges are at an approximately obtuse angle relative to one another. Further, via the third bend, the third and fourth flanges may also be at an angle to one another and, in one embodiment, the angle is approximately ninety (90) degree angle relative to one another. In other embodiments, different angle configurations may be used. The outer portion includes a first flange interconnected to a second flange by a first bend, a second bend interconnecting the second flange to a third flange, a third bend interconnecting the third flange to a fourth flange, and a hem. According to one embodiment, via the first bend, the first and second flanges are at an approximately ninety (90) degrees angle relative to one another while via the second bend, the second and third flanges are at an approximately obtuse angle relative to one another. Further, via the third bend, the third and fourth flanges may also be at an angle to one another and, in one embodiment, the angle is approximately ninety (90) degrees angle relative to one another. Thus, the same or similar angles are used with the outer portion as with the inner portion to create a relatively tight or close joint/seam. Furthermore and in one embodiment, the hem is structured as an acute hem. Therefore, in operation and due to the matching or substantially matching of angles, the first, second, third, and fourth sets of flanges of the inner and outer portions may be engaged while the acute hem may at least partly surround and engage the fourth flange of the inner portion. As a result of the matching and acute hem engagement, a relatively tight connection with minimal gaps is created to couple the panels together. Furthermore and due to the coupling, the front panel 400 and front panel 500 are coupled in a substantially co-planar manner (as compared to a perpendicular manner like shown by the joint 712). Beneficially, manufacture of the front panels may be relatively simple by producing a standard structure (basically, the inner portion of the joint 726) and then creating the flange and bend on the outer portion while cutting or severing an excess part on the inner portion. Therefore, one front panel, which can be used as the inner portion or outer portion of the joint 726 may be produced, which eases production.

As shown and mentioned above, the joint 726 includes an inner portion, representing the front panel 500 part of the joint 726, and an outer portion, representing the front panel 400 part of the joint 726. The inner portion includes a flange 510 interconnected by a bend 511 to a flange 512, which is interconnected by a bend 513 to another flange 514, which is interconnected by another bend 515 to a flange 516. The flanges 510 and 514 extend in a direction towards the storage space 60. Via the bend 511, the flanges 510 and 511 are at an angle 850 relative to each other. In one embodiment and in the example depicted, the angle 850 is a right or substantially right angle. Via the bend 513, the flanges 512 and 514 are at an angle 851 relative to each other. In this example, the angle 851 is an obtuse angle. Finally, via the bend 515, the flanges 514 and 516 are at an angle 852 relative to each other. As shown, the angle 852 is or is approximately equal to ninety (90) degrees. In comparison, the outer portion includes a flange 420 interconnected by a bend 421 to a flange 422, which is interconnected by a bend 423 to another flange 423, which is interconnected by a bend 425 to another flange 426. The flange 426 is interconnected to a hem including a bend 427, flange 428, and end 429. In the example shown, the hem is an acute hem. In other embodiments, a different hem configuration may be used. Via the bend 511, the flanges 420 and 422 are at an angle 853 relative to each other. In one embodiment and in the example depicted, the angle 853 is a right or substantially right angle. Via the bend 423, the flanges 422 and 424 are at an angle 854 relative to each other. In this example, the angle 854 is an obtuse angle. Finally, via the bend 425, the flanges 424 and 426 are at an angle 855 relative to each other. As shown, the angle 855 is or is approximately equal to ninety (90) degrees. Thus, the angles of the inner portion and outer portion substantially match to enable a fairly close coupling between the front panels 400 and 500.

Based on foregoing, an example method 1000 of assembling the outer cabinet of the housing of an enclosure, such as an ice merchandiser, is shown pictorially in FIGS. 20-37. Similar reference numbers are used in FIGS. 20-37 as used in FIGS. 1-19 with the following exceptions. First, the assembled outer cabinet of FIGS. 20-37 does not include two coupled front panels, such that joint 726 is not shown in this process. Second, an alternative to joints 712 and 718 is shown in this process. The alternative joint—joint 730—is similar in function as joints 712 and 718, but has a different structure, which is explained herein below.

Figure 20:
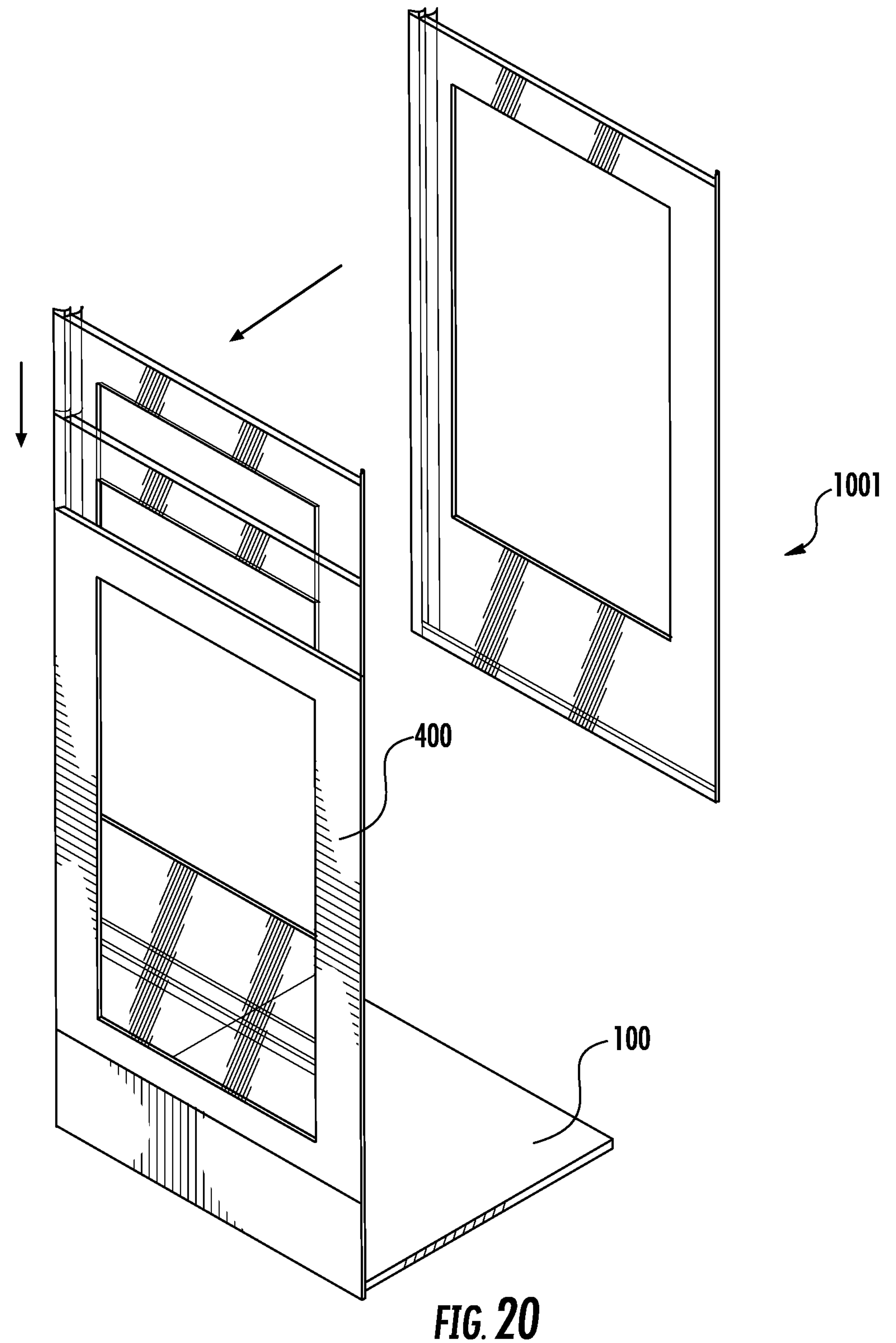
FIGS. 20-37 pictorially depict a method of assembling an outer cabinet of an enclosure, such as an ice merchandiser, according to various example embodiments.
Figure 21:
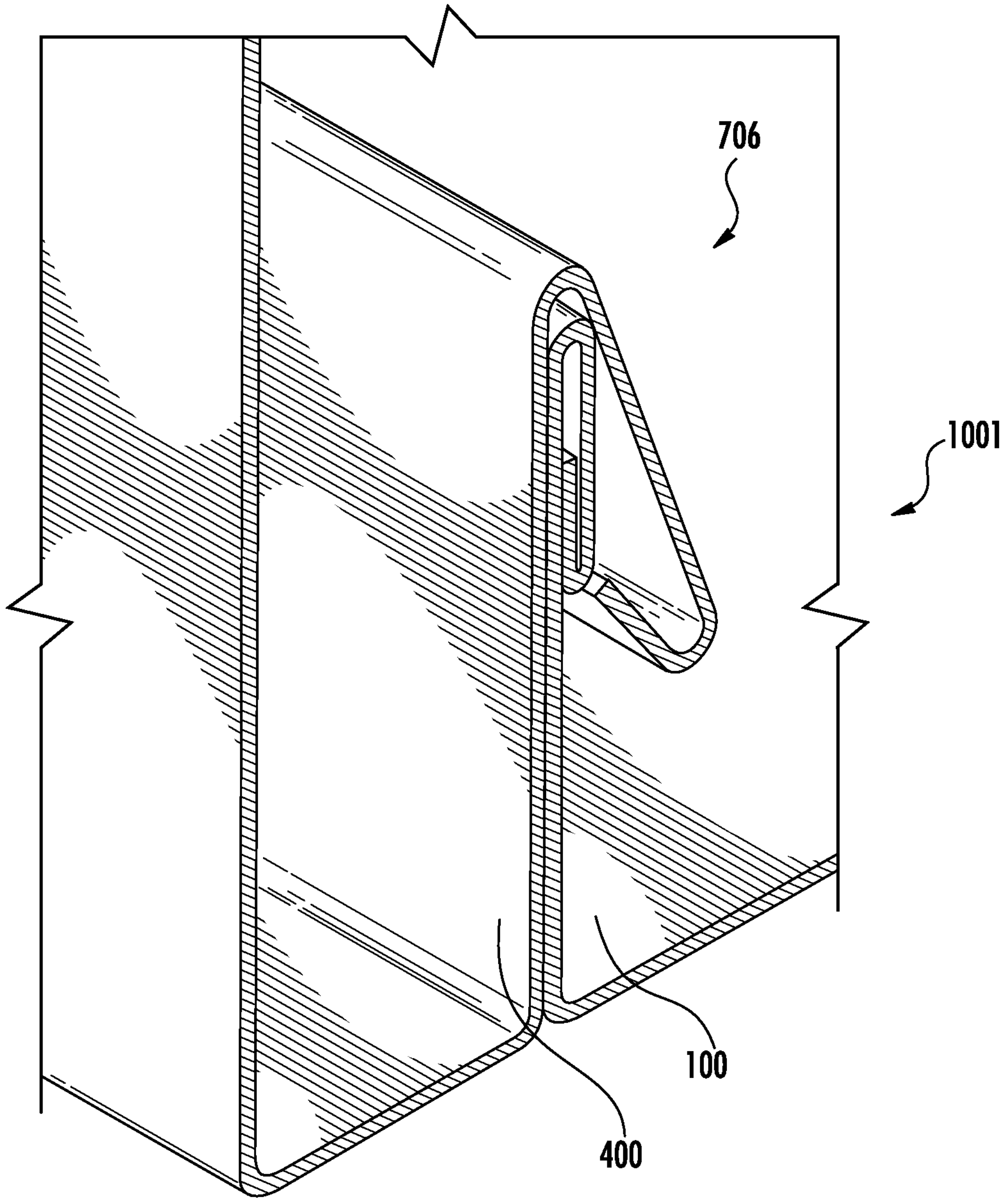
Figure 22:
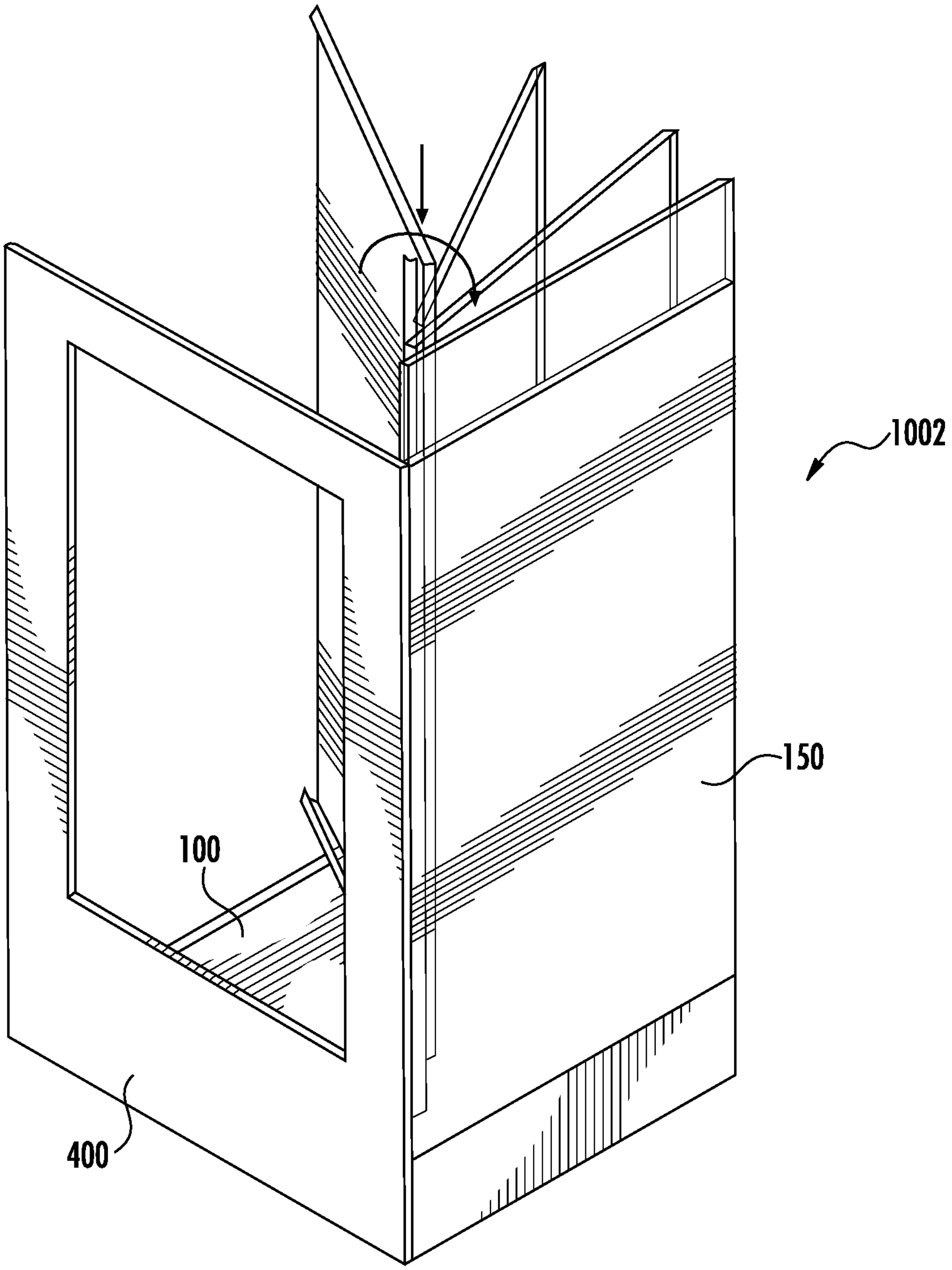

At step 1001, the front panel 400 is coupled to the base panel 100 (see FIGS. 20-21). As shown in FIG. 21, coupling of the front panel 400 to the base panel 100 is via joint 706, which is explained herein above in regard to FIGS. 4 and 10. During assembly, the front panel 400 is slid, moved, or otherwise translated over the planar portion of the joint 706 (i.e., the part associated with the base panel 100). The angled portion of the joint 706 may flex or bend to surround or substantially surround the planar portion. A click, snap, or other audible noise may be generated to indicate coupling between the front panel 400 and base panel 100.

At step 1002, the right side panel 150 is coupled to the front panel 400 (see FIGS. 22-26). As shown, coupling of the right side panel 150 to the front panel 400 is via a joint 730. As mentioned above, joint 730 represents an alternative joint to joints 712 and 718. While the joint 730 is substantially similar to the joints 712 and 718, the joint 730 includes relatively more flanges. In particular and as shown, the joint 730 includes an outer portion and an inner portion. The outer portion of the joint 730 (representing the front panel 400 portion) includes a flange 450 interconnected to a bend 451 that is interconnected to a flange 452, bend 453, flange 454, bend 455, flange 456, and a hem including a bend 457, flange 458, and end 459. In the example shown, the hem is an acute hem. In other embodiments, a different hem configuration may be used. Via the bend 451, the flanges 450 and 452 are at an angle relative to each other. In one embodiment and in the example depicted, the angle is a right or substantially right angle. Via the bend 453, the flanges 452 and 454 are at an angle 860 relative to each other. In this example, the angle 860 is an obtuse angle. Finally, via the bend 455, the flanges 454 and 456 are at an angle relative to each other. As shown, the angle is or is approximately equal to ninety (90) degrees. The inner portion includes a flange 170 interconnected by a bend 171 to a flange 172, which is interconnected by a bend 173 to another flange 174, which is interconnected by another bend 175 to a flange 176, which is interconnected by a bend 177 to another flange 178. Via the bend 511, the flanges 510 and 511 are at an angle 850 relative to each other. In one embodiment and in the example depicted, the angle 840 is a right or substantially right angle. Via the bend 171, the flanges 170 and 172 are at an angle relative to each other. In this example, the angle is or approximately equal to ninety (90) degrees. Via the bend 173, the flanges 172 and 174 are at an angle relative to each other. In this example, the angle is or approximately equal to ninety (90) degrees. Via the bend 175, the flanges 174 and 176 are at an angle 861 relative to each other. In this example, the angle 861 is an obtuse angle. Finally, via the bend 177, the flanges 176 and 178 are at an angle relative to each other. In this example, the angle is or approximately equal to ninety (90) degrees. Thus, because the angles of the flanges of the inner and outer portion are substantially equal to each other, a relatively tight coupling may be achieved.

Figure 23:
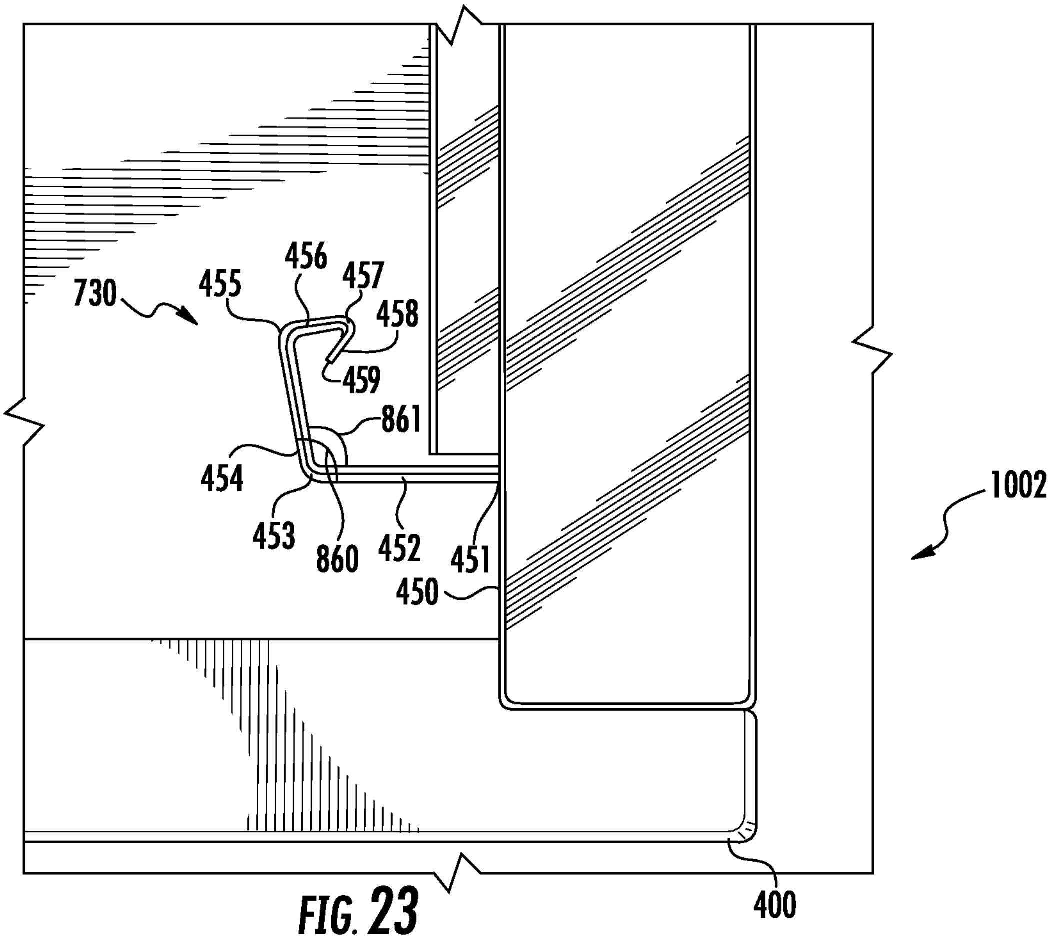
Figure 24:
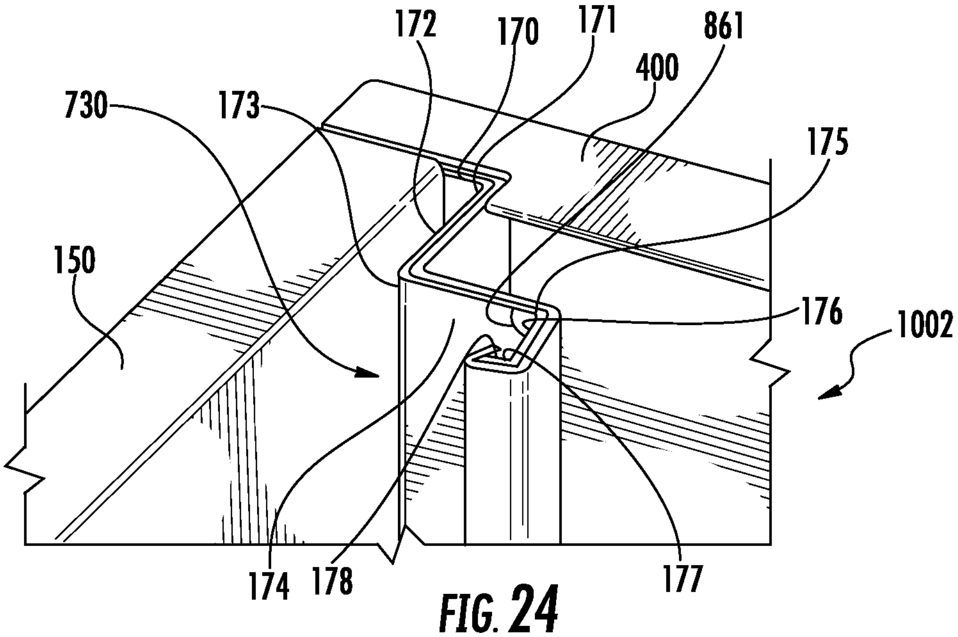
Figure 25:
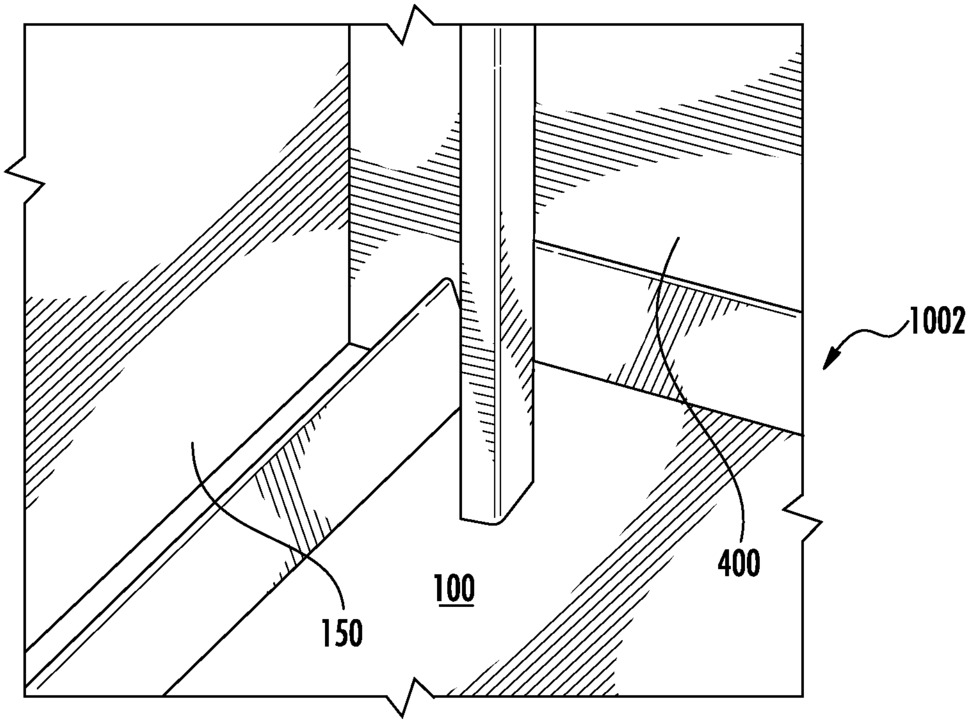
Figure 26:
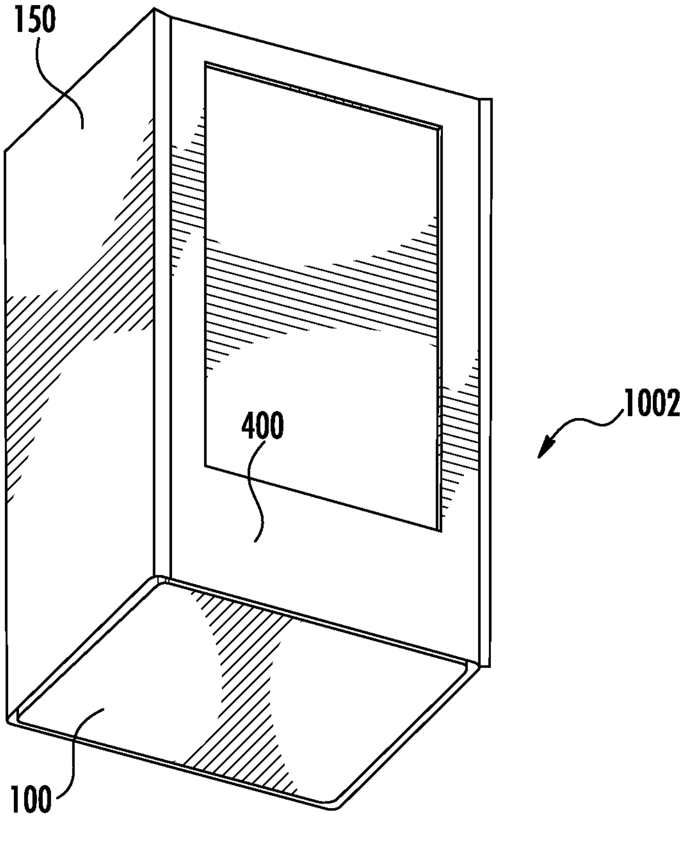

In particular and in operation, the right side panel 150 is rotated relative to the front panel 400 to couple the right side panel 150 to the front panel 400, as shown in FIGS. 23-24. FIGS. 25-26 depicted the coupled right side panel 150 and front panel 400. According to one embodiment, coupling the right side panel 150 to the front panel 400 also includes the generation of an audible noise (e.g., a click, snap, etc.) that provides an audible cue that the panels 150, 400 are coupled together.

Figure 27:
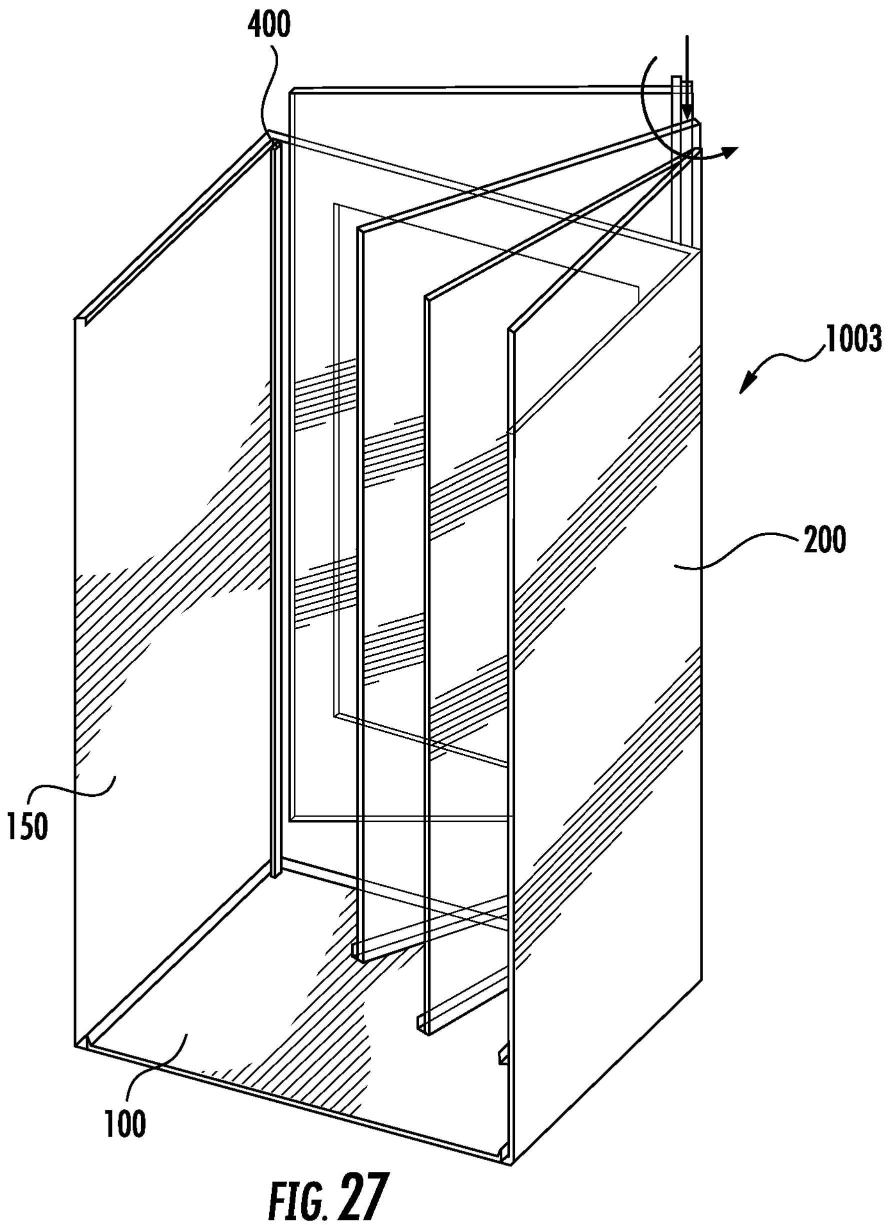

At step 1003, the left side panel 200 is coupled to the front panel 400 (see FIG. 27). Similar to step 1002, coupling of the left side panel 200 to the front panel 400 is via the same type of joint as shown in step 1002 (i.e., joint 730), except that the joint is applied with the front panel 400 and left side panel 200. Accordingly and as described above in step 1002, the left side panel 200 is rotated into a coupled position with the front panel 400 in order to engage inner and outer portions of the joint to couple the left side panel 200 to the front panel 400. According to one embodiment, coupling the left side panel 200 to the front panel 400 also includes the generation of an audible noise (e.g., a click, snap, etc.) that provides an audible cue that the panels 200, 400 are coupled together.

Figure 28:
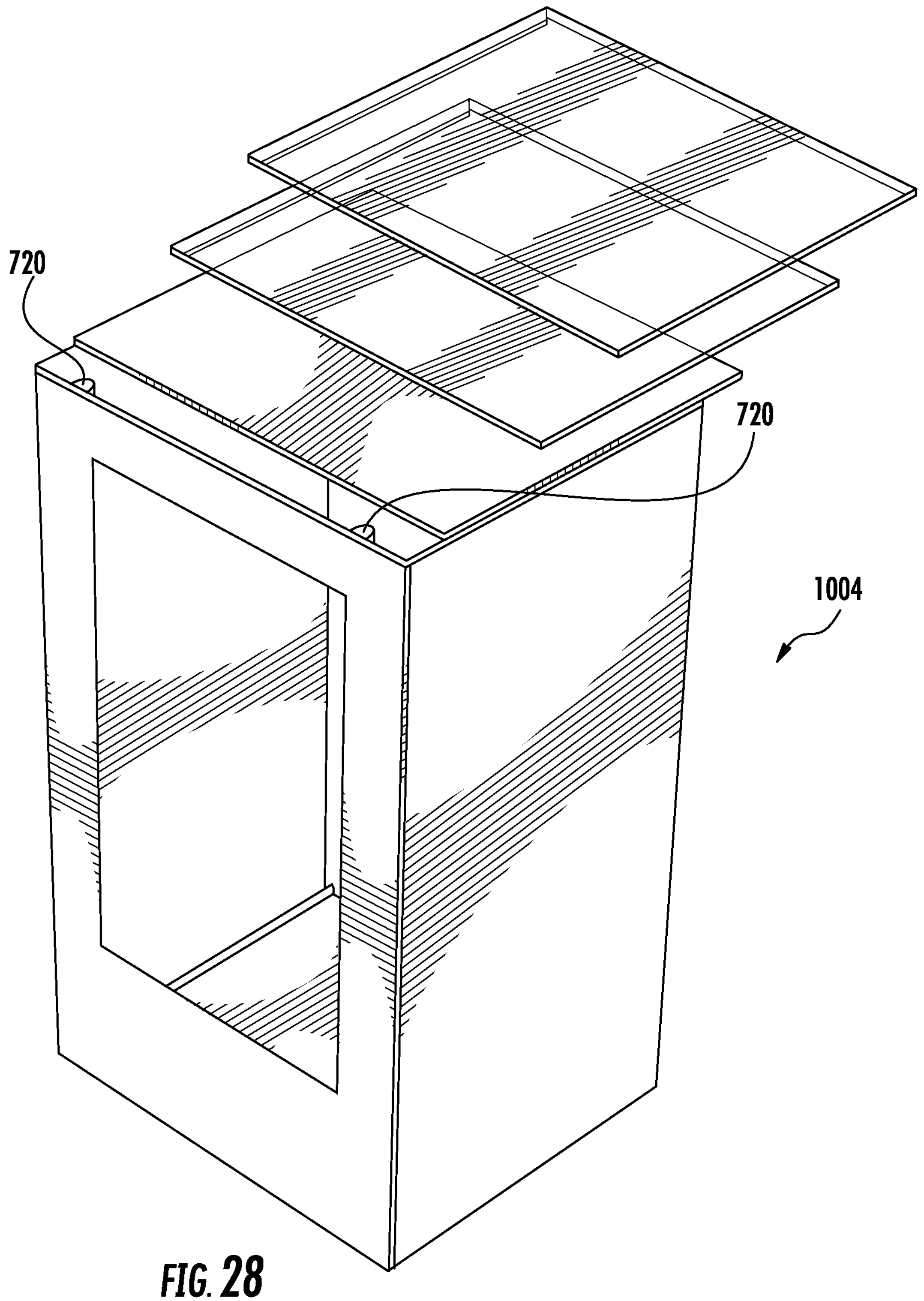
Figure 29:
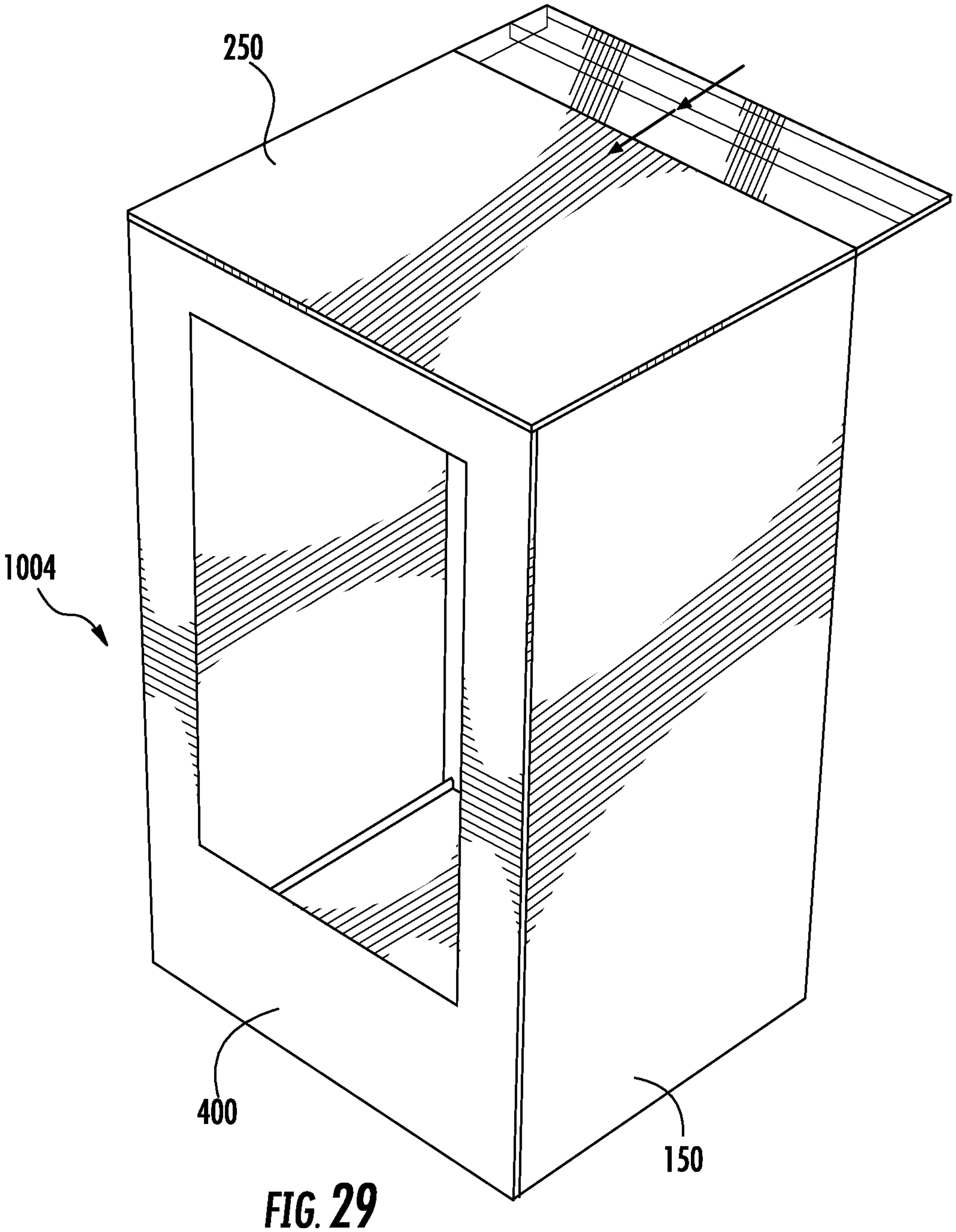
Figure 30:
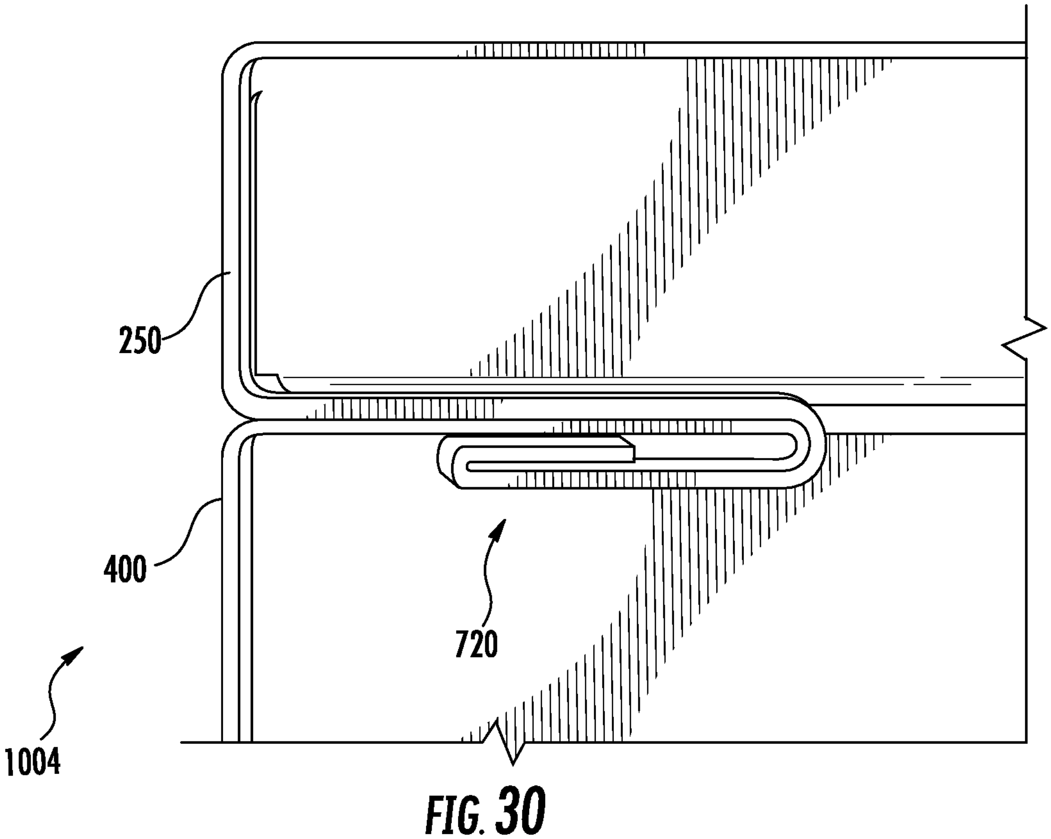

At step 1004, the top panel 250 is coupled to the front panel 400 (see FIGS. 28-30). More particularly, the top panel 250 is coupled to the front panel 500 via joint 720, as described herein above in regard to FIGS. 4, 11, and 12. As shown in FIG. 28, there are two joint 720*s* for coupling the left and right sides of the top panel 250 to the left and right sides of the front panel 400. In operation, the top panel 250 slides, moves, or translates to engage with the inner portion of the joint 720 associated with the front panel 400. At this point, the top panel 250 is coupled to the front panel 400. Applicant has determined that coupling the top panel prior to coupling the rear panels to form the outer cabinet 80 eases assembly of the ice merchandiser 10 by permitting relatively easier plumbing of, e.g., copper lines in the housing 50 that are used with the cooling system 40.

Figure 31:
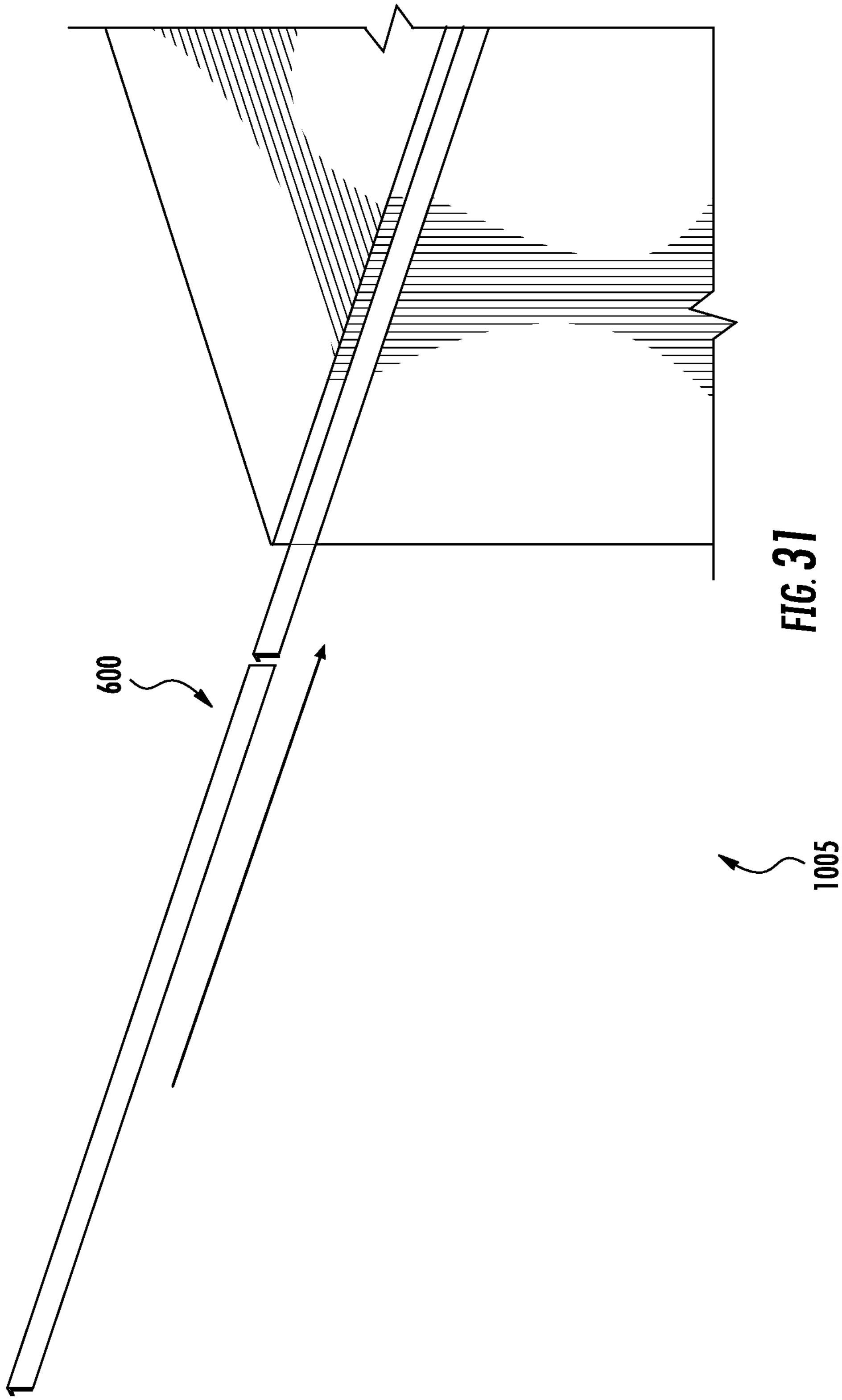
Figure 32:
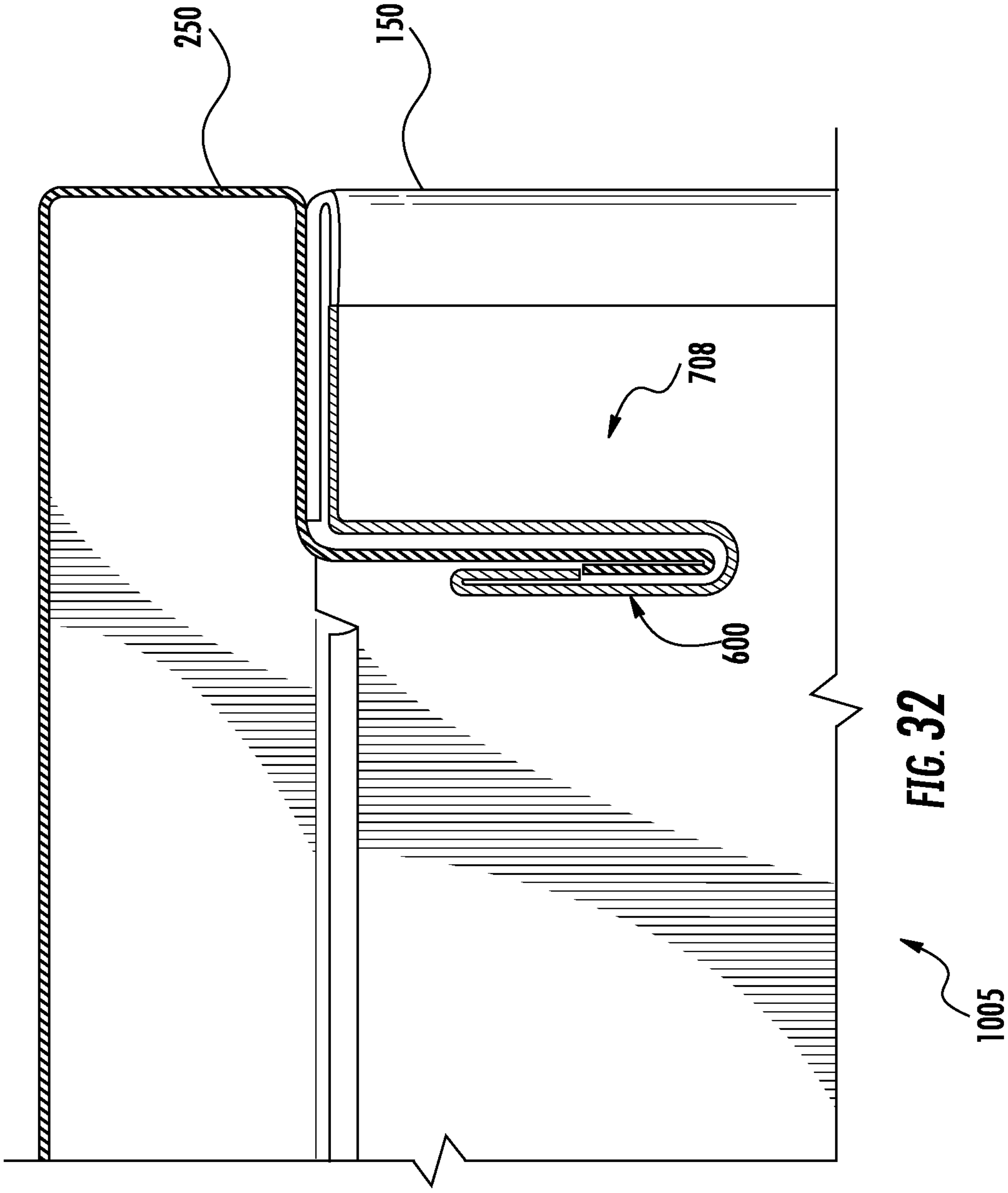

At step 1005, the top panel 250 is coupled to each of the right and left side panels 150 and 200, respectively (see FIGS. 31-32, where FIG. 32 depicts the right panel 150 to top panel 250 panel coupling). As shown, step 1005 utilizes the joint 708 for the right side panel 150 to top panel 250 coupling and the joint 714 represents the top panel 250 to left side panel 200 coupling. More particularly, step 1005 includes aligning the top panel 250 with each of the right and left side panels 150, 250 and sliding a slide channel 600 over flanges associated with each of the right and left side panels 150, 200 (one slide channel 600 per each of the right and left panels), as described above with respect to FIGS. 3 and 8-9. Full engagement of the slide channel 600 with each of the flanges for each side may be characterized by the generation of an audible noise (e.g., snap, click, etc.). The audible noise may signify complete or full engagement to the technician/assembly person.

Figure 33:
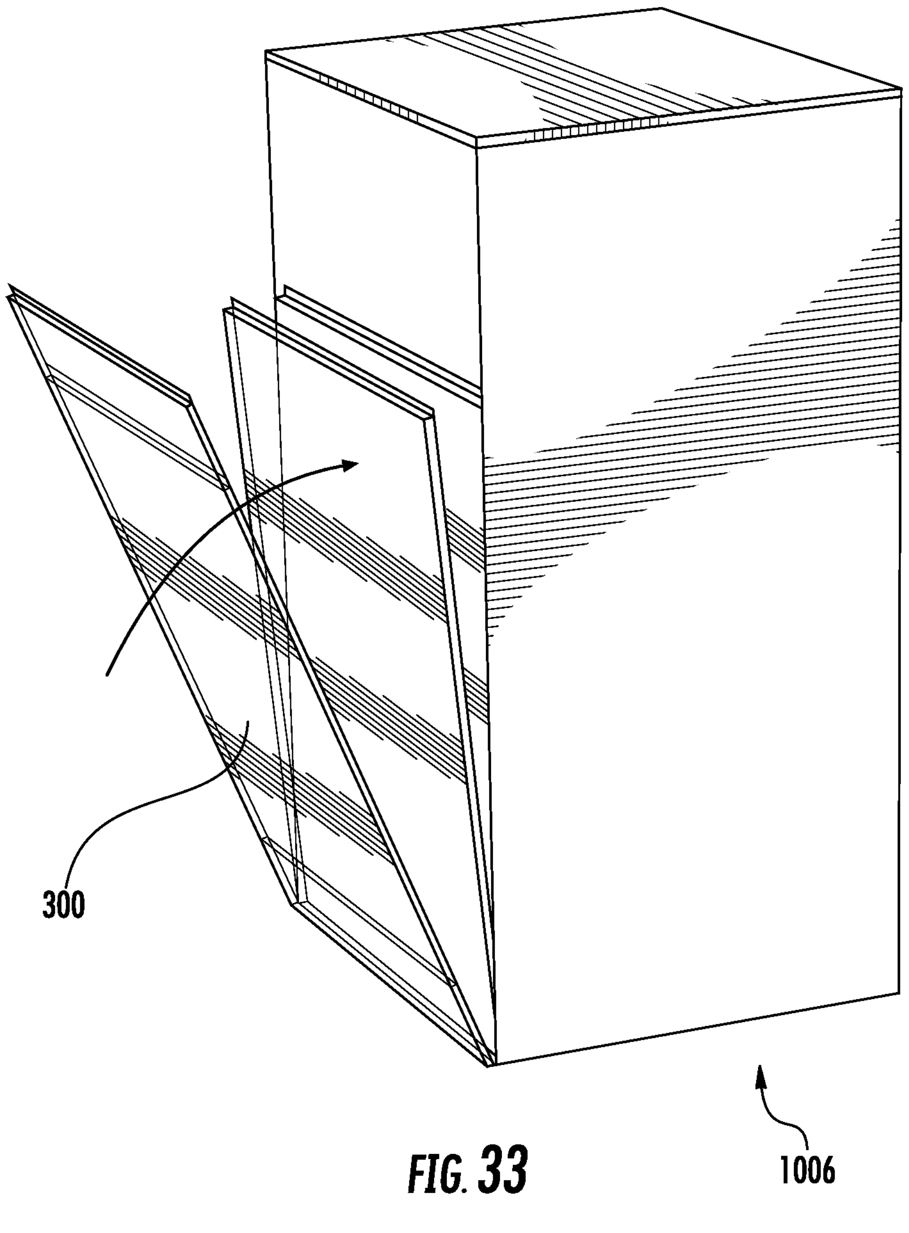

At step 1006, the lower rear panel 300 is coupled to the base panel 100 and to each of the right and left side panels 150, 200 (see FIG. 33). In particular, the lower rear panel 300 is coupled to the base panel 100 via the joint 704 (see FIG. 13). In operation, the lower rear panel 300 is pressed downward onto the bottom panel 100 while at or substantially at the same time connected or coupled to both of the right and left side panels 150, 200. According to one embodiment, coupling the lower rear panel 300 to the base panel 100 and to each of the right and left side panels 150, 200 also includes the generation of an audible noise (e.g., a click, snap, etc.) that provides an audible cue that the panels are coupled together.

Figure 34:
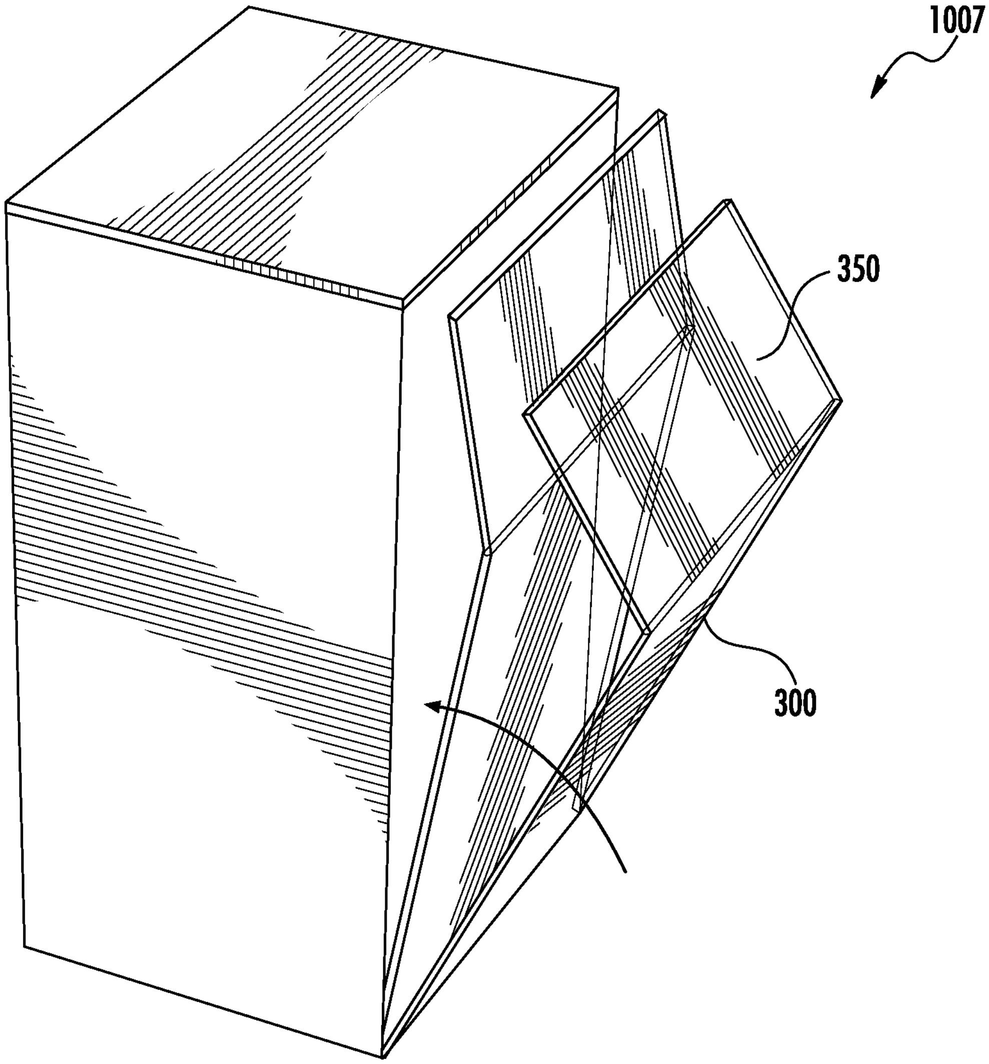
Figure 35:
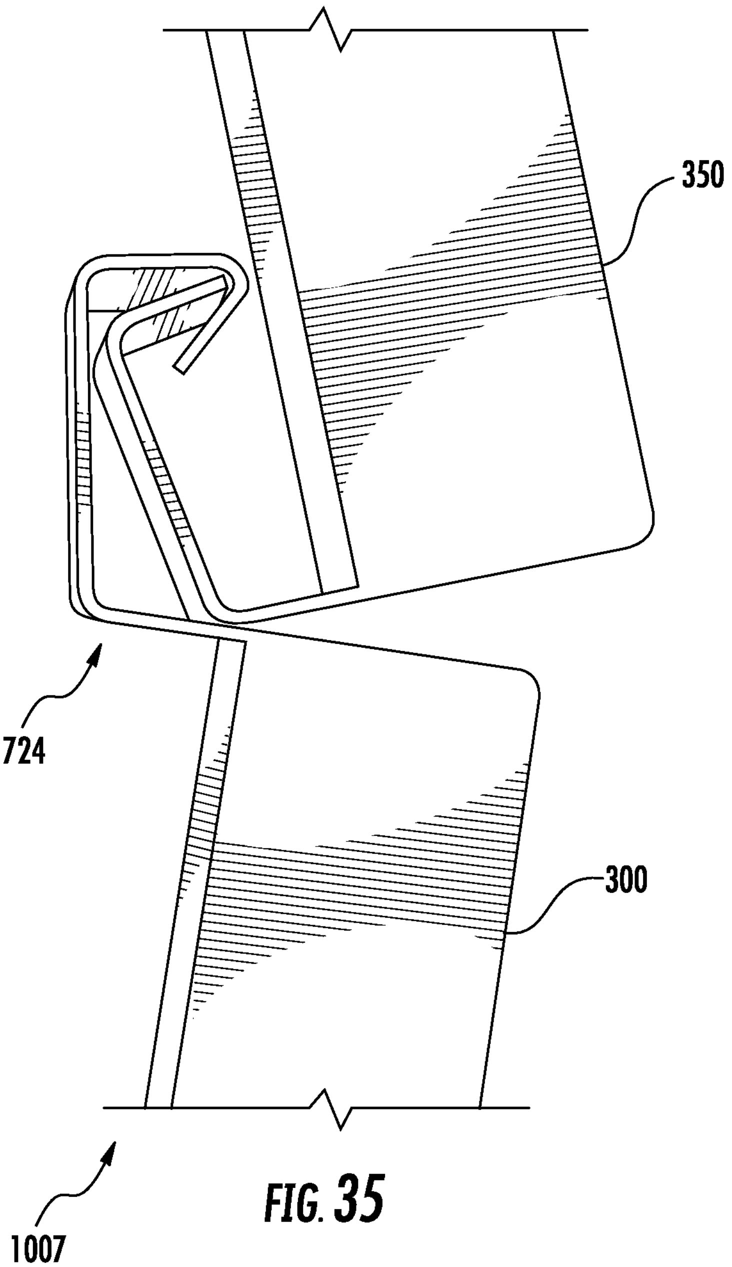
Figure 36:
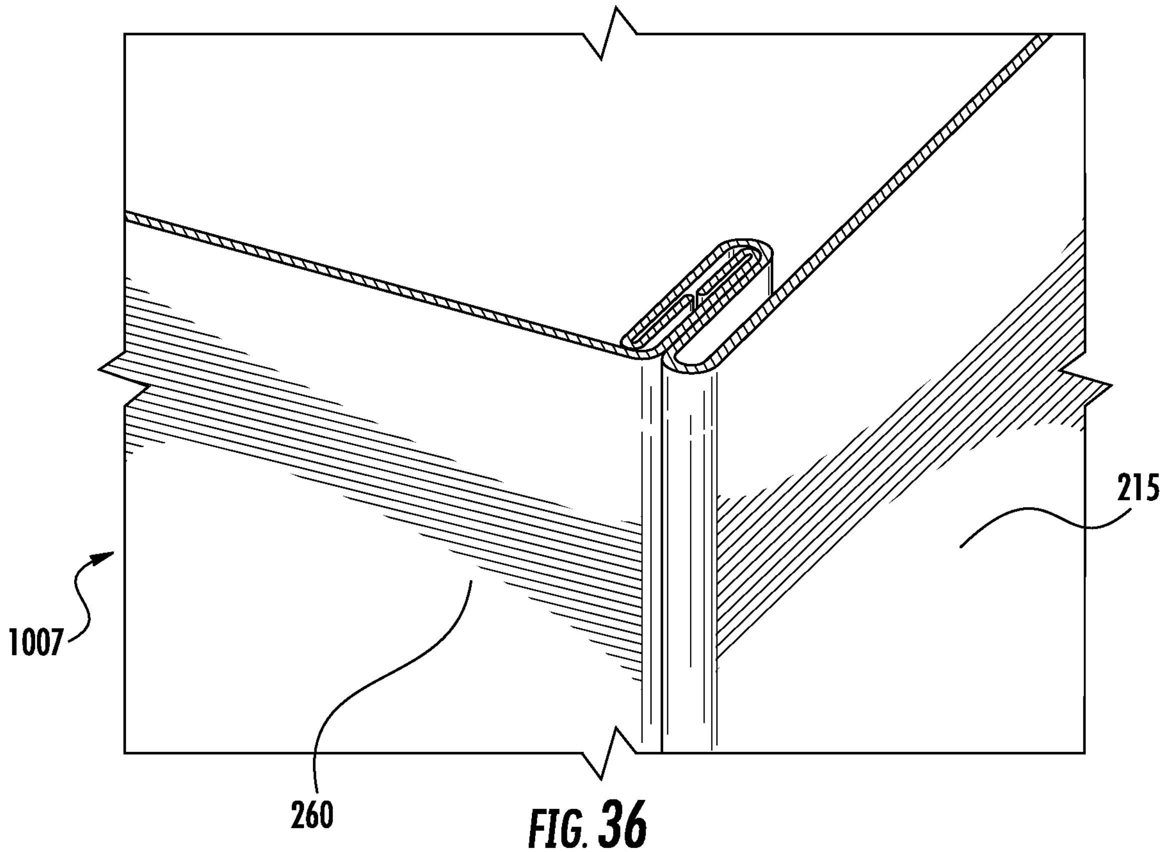
Figure 37:
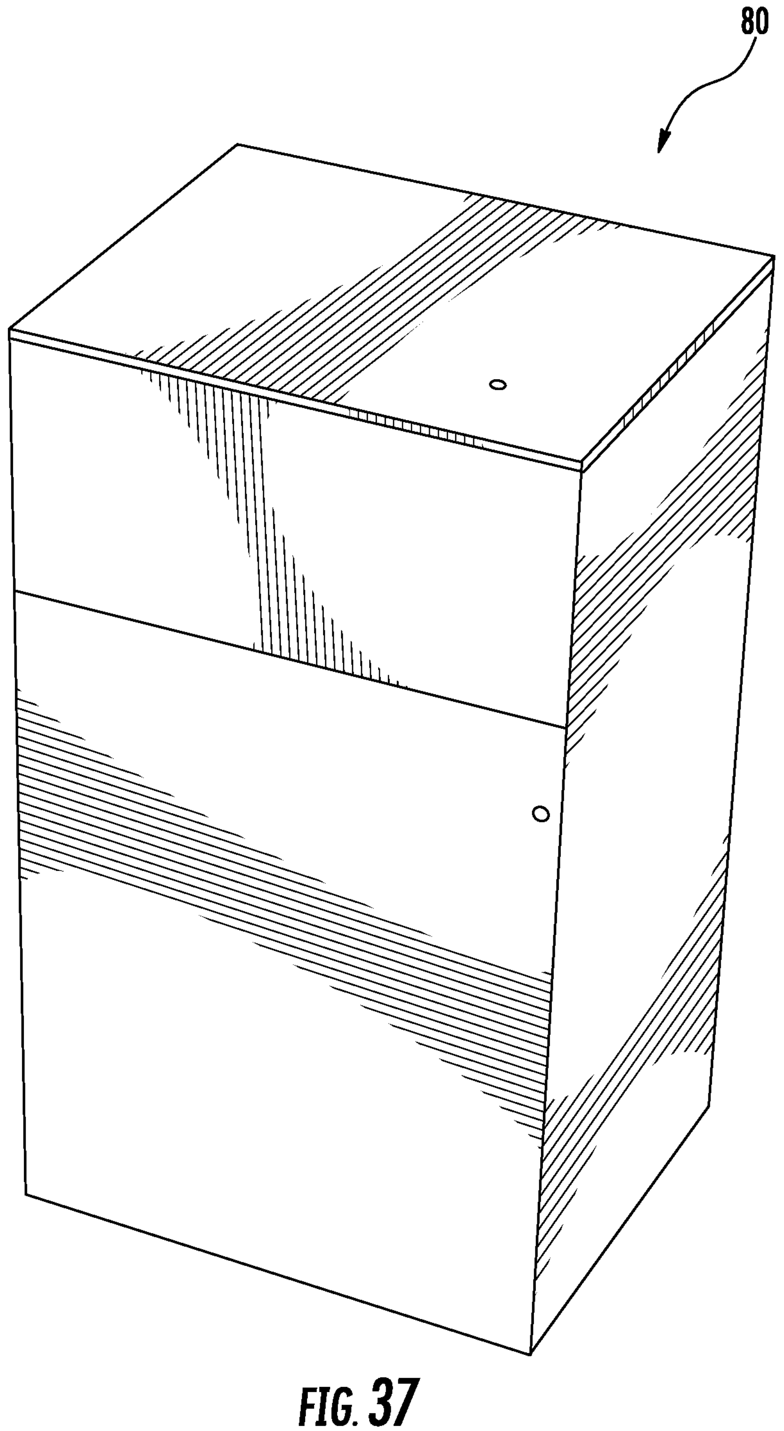

At step 1007, the upper rear panel 350 is coupled to the lower rear panel 300 (see FIGS. 34-36). As shown, coupling of the upper rear panel 350 to the lower rear panel 300 is via the joint 724. More particularly, the outer portion of the joint 724 (i.e., part from the upper panel 350) is received in the inner portion of the joint 724 and rotated to create the joint 724 and abut panel 300 to panel 350 in a planar manner (i.e., the coupled panels 300, 350 are coplanar). In one embodiment, step 1007 is accomplished after step 1006. In another embodiment, step 1007 is performed prior to step 1006, such that in this modified version, step 1006 includes coupling the coupled rear panels 300, 350 to the bottom panel 100, right and left side panels 150 and 200, and the top panel 250. Accordingly, additional explanation may be described herein above and with reference to FIG. 14. Upon coupling, FIG. 37 depicts the assembled outer cabinet 80, according to one embodiment.

Beneficially, the assembly of the enclosure 80 is shown to correspond with various audible indicators (e.g., cues, indicia, etc.). While the audible indicator (e.g., a snap) may be helpful to indicate coupling and alignment, other indicia or cues may also be included as well that further help indicate coupling and alignment. In this regard and in addition to the aforementioned audible cues, assembly of the enclosure 80 may also correspond with visual and tangible cues (i.e., a touch indicator). For example, during the creation of the audible noise in at least steps 1001, 1002, 1003, and 1006, the assembly person may experience resistance due to the bending of one or more flanges when the joints are being created. Upon creation, the assembly person may feel a snap-back of one or more flanges or a decrease in resistance, which not only results in an audible noise but also represents a tangible indicator. Further and because the joints created may correspond with minimal gaps (as described herein), a visual cue may be provided to the assembly person as well to know that the joint is correctly formed. As a result, tangible, audible, and visual cues may be provided to the assembly personnel assembling the cabinet 80, which advantageously may result in a relatively high amount of confidence for the assembly personnel knowing that the joint and cabinet was assembled correctly.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

Additionally and for the purposes of this disclosure, the terms "approximately" and "substantially" or other like terms are intended to be understood and broadly interpreted by those of ordinary skill in the art. For example, when the disclosure defines an angle as approximately equal to a value or substantially equal to a value, these terms are intended to be broadly defined and interpreted by those of ordinary skill in the art. For example, these terms may be a predefined value (e.g., approximately may mean plus-or-minus X). As another example, these terms may refer to a commonly accepted tolerance level. As still another example, these terms may refer to a statistical determination based on a series of samples. Similarly, the terms "match" or "substantially match" are also meant to be broadly interpreted. Accordingly, in one example, match or substantial match may refer to an exact match. In another example, match or substantial matching refers to a dimension or value being within a predefined tolerance, amount, standard, or an accepted qualitative measurement technique.

It is to be understood that the disclosure disclosed herein is not limited to the details of construction and the arrangement of the components set forth in the description or illustrated in the drawings. The disclosure is capable of other embodiments or being practiced or carried out in various ways. It is also to be understood that the phraseology and terminology employed herein is for the purpose of description and should not be regarded as limiting.

It is also important to note that although only a few embodiments of the enclosure assembly have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the disclosed embodiments. Accordingly, all such modifications are intended to be included within the scope of the present disclosure as defined in the disclosed embodiments.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

What is claimed:

1. A method of assembling an outer cabinet of an enclosure, the method comprising:

coupling a first panel of the outer cabinet to a second panel of the outer cabinet utilizing a first joint type;

coupling a third panel of the outer cabinet to the first panel using a second joint type by rotating the third panel relative to the first panel so that a first outer flange of the first panel engages a first inner flange of the third panel and a second outer flange engages a second inner flange of the third panel, wherein a third outer flange coupled to the second outer flange extends at an angle towards the second inner flange when the third panel is coupled to the first panel;

coupling a fourth panel of the outer cabinet to the first panel using the second joint type by rotating the fourth panel relative to the first panel;

coupling a fifth panel of the outer cabinet to the first panel using a third joint type;

coupling the fifth panel to the third panel and to the fourth panel using a fourth joint type; and coupling a sixth panel to each of the second, third, fourth, and fifth panels to form the outer cabinet.

2. The method of claim 1, wherein the fourth joint type includes a first slide channel and a second slide channel, wherein the fifth panel is coupled to the third panel using the first slide channel and the fifth panel is coupled to the fourth panel using the second slide channel.

3. The method of claim 2, further comprising aligning a first flange of the fifth panel with a third inner flange of the third panel, aligning a second flange of the fifth panel with a flange of the fourth panel, and moving a channel defined by the first slide channel into a position where the first flange of the fifth panel and the third inner flange of the third panel are received in the channel of the first slide channel to couple the fifth panel to the third panel.

4. The method of claim 3, further comprising moving a channel defined by the second slide channel into a position where the second flange of the fifth panel and the flange of the fourth panel are received in the channel of the second slide channel to couple the fifth panel to the fourth panel.

5. The method of claim 4, wherein the channel defined by the first slide channel and the channel defined by the second slide channel are each u- or substantially u-shaped.

6. The method of claim 2, further comprising creating an audible noise during coupling of the first slide channel to each of the third panel and the fifth panel to indicate coupling of the first slide channel to each of the third panel and the fifth panel.

7. The method of claim 1, wherein the coupling of each panel of the outer cabinet is without a fastener.

8. The method of claim 1, wherein each of the first, second, third, and fourth joint types are different.

* * * * *